(12) United States Patent
Oglesby et al.

(10) Patent No.: US 6,244,853 B1
(45) Date of Patent: Jun. 12, 2001

(54) GAS BURNER AND A GAS POWERED HEATING DEVICE

(75) Inventors: Alfred P Oglesby; John P Oglesby, both of Carlow (IE)

(73) Assignee: Oglesby & Butler Research & Development Limited, Carlow (IE)

( * ) Notice: Subject to any disclaimer, the term of this patent is extended or adjusted under 35 U.S.C. 154(b) by 0 days.

(21) Appl. No.: 09/155,477

(22) PCT Filed: Apr. 4, 1997

(86) PCT No.: PCT/IE97/00029

§ 371 Date: Sep. 29, 1998

§ 102(e) Date: Sep. 29, 1998

(87) PCT Pub. No.: WO97/38265

PCT Pub. Date: Oct. 16, 1997

(30) Foreign Application Priority Data

Apr. 4, 1996 (IE) .......................................... 960276
Mar. 27, 1997 (IE) .......................................... 970242

(51) Int. Cl.[7] ........................................................ F23N 5/20
(52) U.S. Cl. .................... 431/6; 431/72; 431/128; 431/264; 431/268; 431/350; 431/353; 126/413
(58) Field of Search .................... 437/6, 12, 72, 437/127, 128, 132, 264, 268, 7, 344, 350, 353, 346, 326; 126/401–414, 236, 237

(56) References Cited

U.S. PATENT DOCUMENTS

| 4,248,208 | * | 2/1981 | Diedrich ................................. 126/409 |
| 4,502,465 | * | 3/1985 | Yoshinaga et al. ................... 126/409 |
| 4,785,793 | * | 11/1988 | Oglesby et al. ...................... 126/414 |
| 4,858,593 | * | 8/1989 | Hsu ....................................... 126/414 |
| 4,920,952 | * | 5/1990 | Nakajima ............................. 126/401 |
| 5,094,611 | * | 3/1992 | Suppiah et al. ...................... 431/268 |
| 5,394,862 | * | 3/1995 | Firatli et al. ............................. 431/7 |

FOREIGN PATENT DOCUMENTS 42 22 711  *  1/1994 (DE) .

* cited by examiner

Primary Examiner—Ira S. Lazarus
Assistant Examiner—Josiah C. Cocks
(74) Attorney, Agent, or Firm—Sughrue, Mion, Zinn, Macpeak & Seas, PLLC

(57) ABSTRACT

A soldering iron (1) comprises a soldering head (4) connected to a handle (2). A cylindrical catalytic element (20) located in a combustion chamber (8) converts gas to heat for heating a soldering tip (15). An electrode (40) located within the catalytic element (20) initially ignites a fuel gas/air mixture to burn in a flame (42) within the catalytic element (20) for raising the temperature of a downstream portion (50) of the catalytic element (20) to its ignition temperature. Heat from the downstream portion (50) raises an upstream portion (51) of the catalytic element (20) upstream of the flame (42) to its ignition temperature, which then commences to convert the fuel gas/air mixture to heat. This starves the flame (42) of fuel gas/air mixture, thus extinguishing the flame (42) so that the catalytic element (20) continues to convert fuel gas/air mixture to heat in a catalytic reaction.

28 Claims, 9 Drawing Sheets

Figure 12:
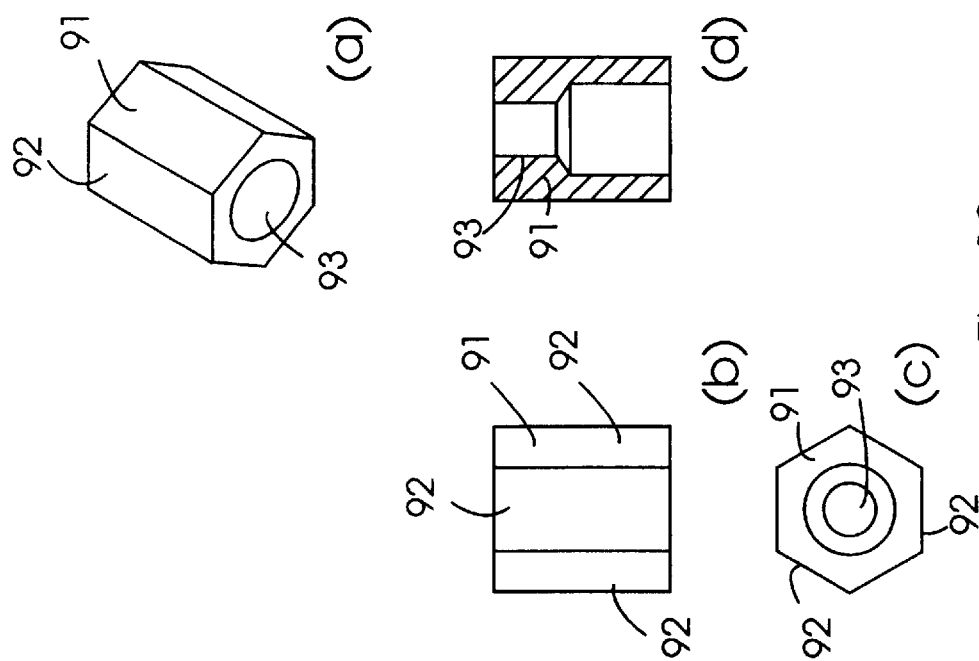

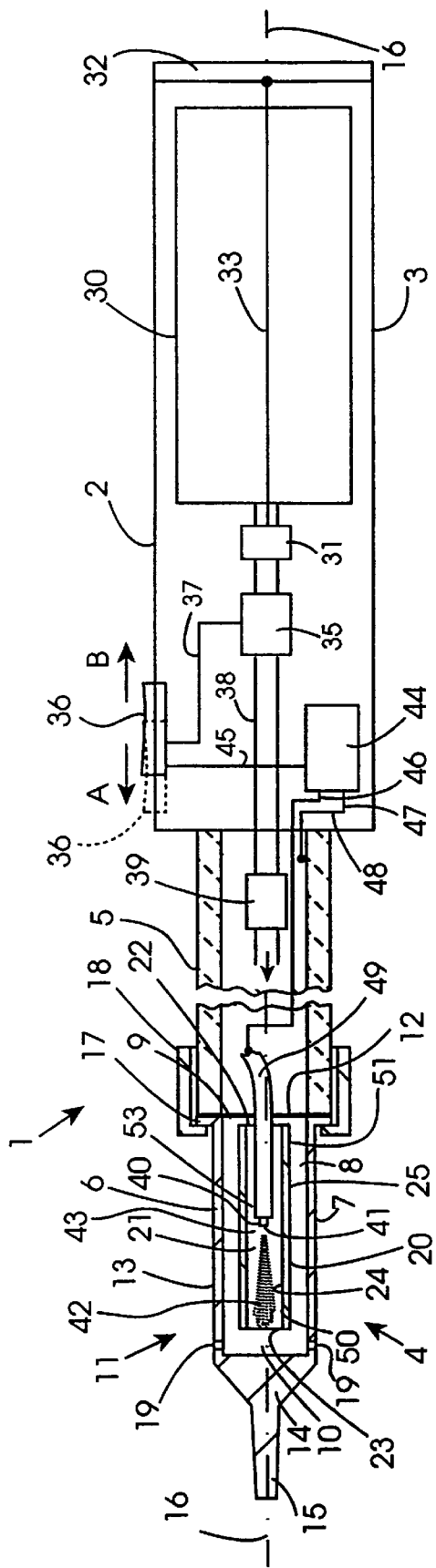
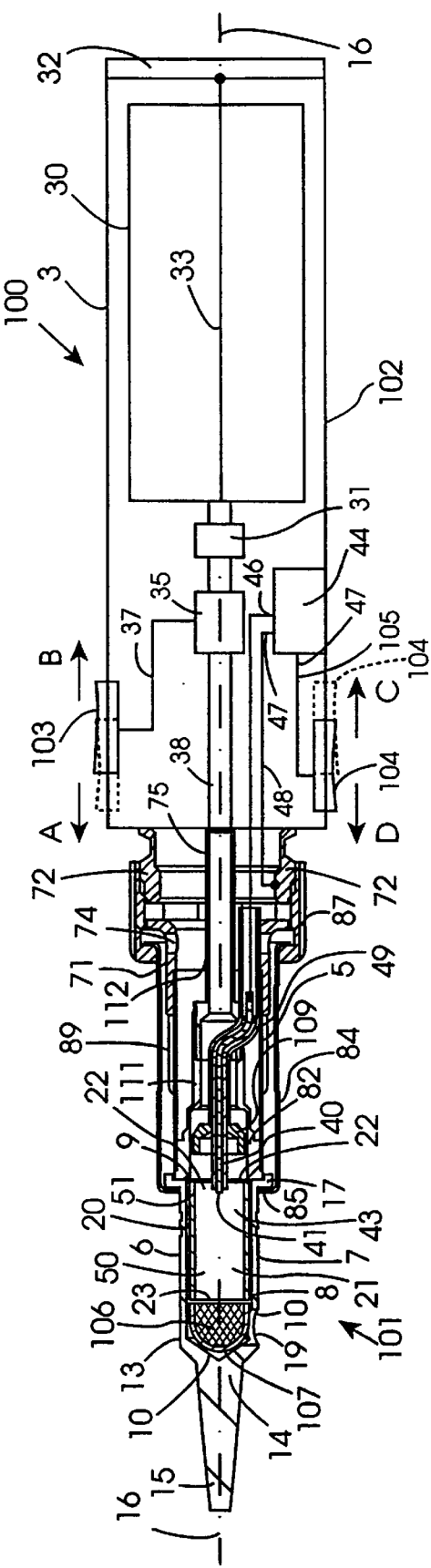
Fig. 1
Fig. 13

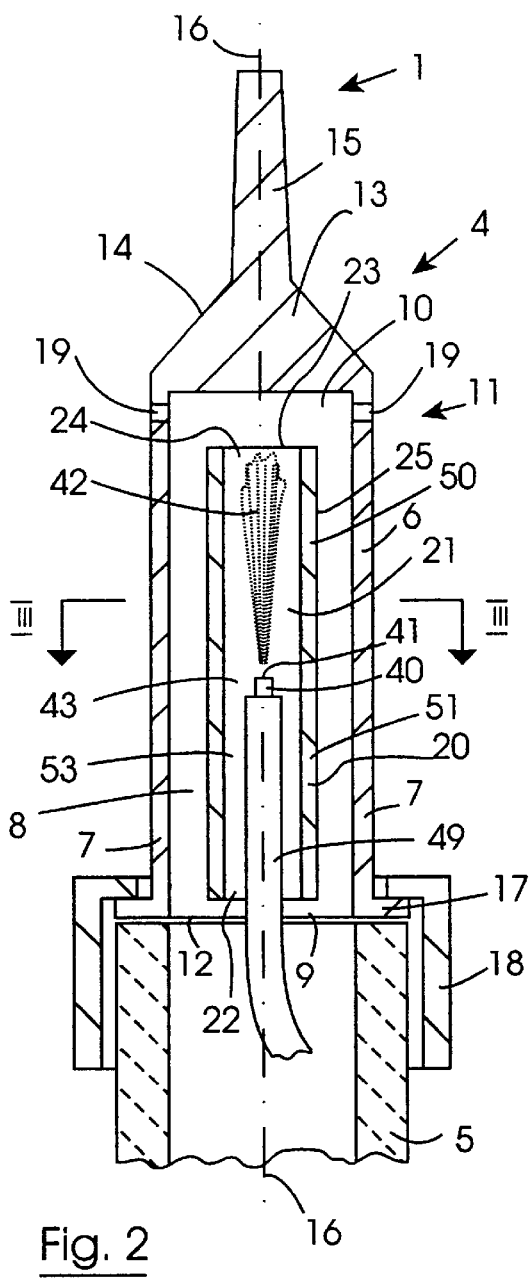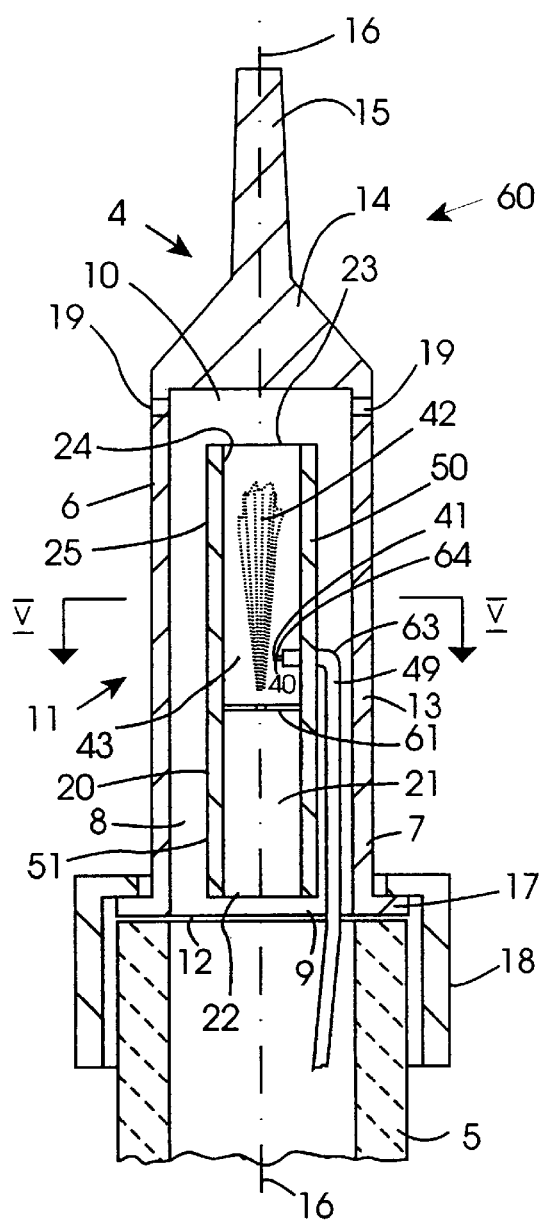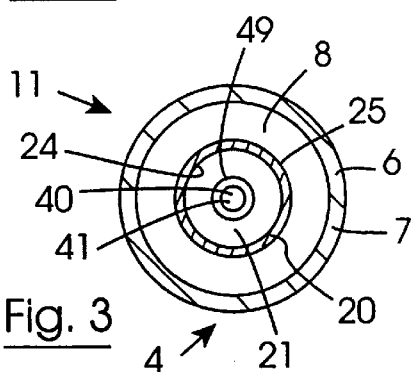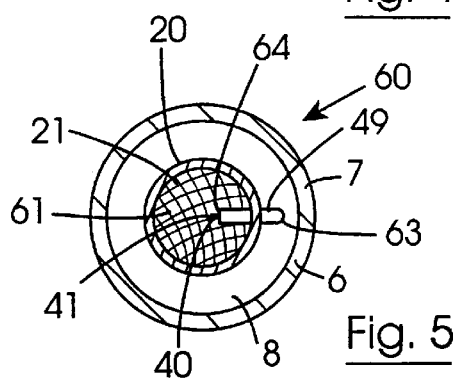
Fig. 2
Fig. 3
Fig. 4
Fig. 5

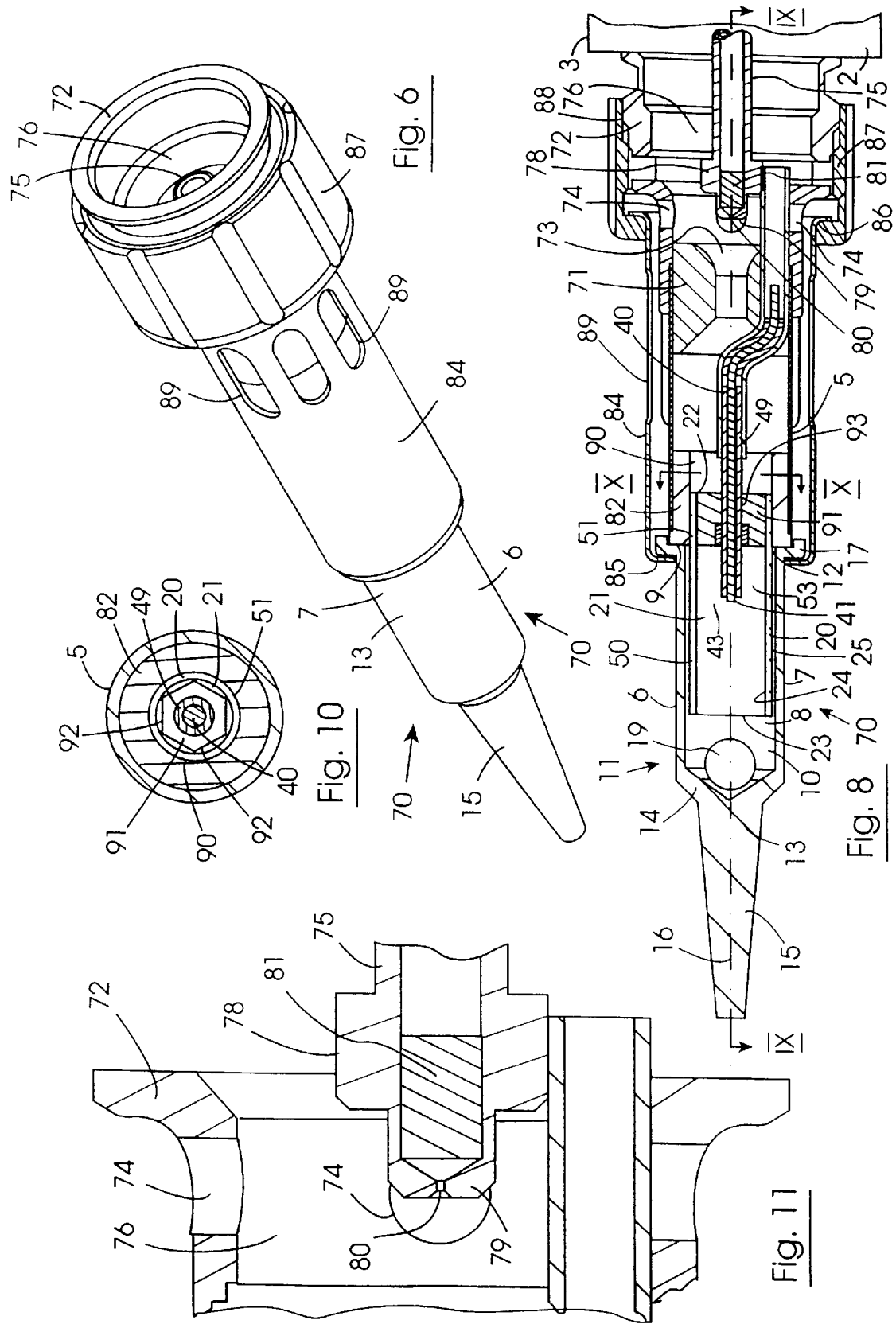

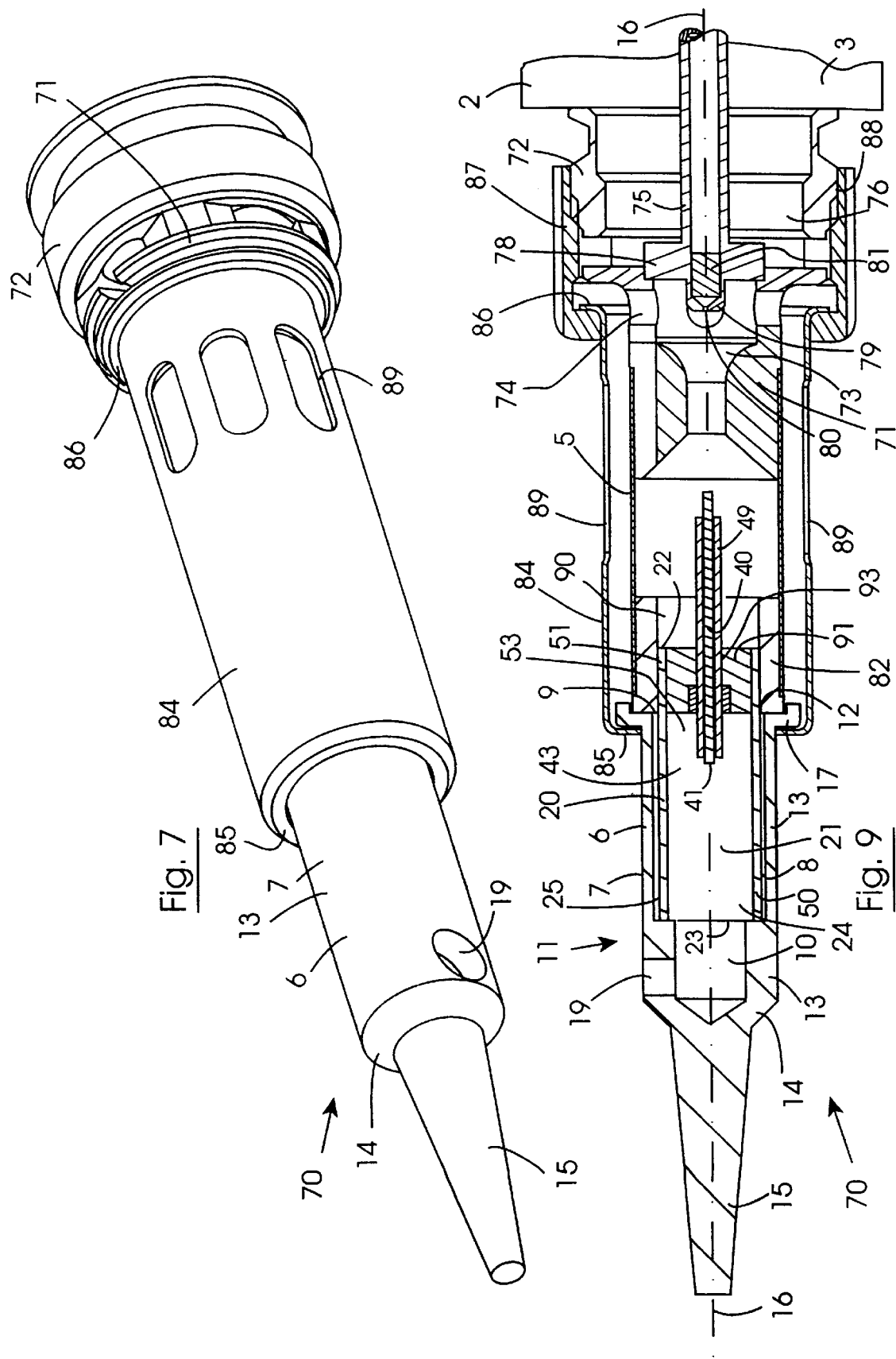

GAS BURNER AND A GAS POWERED HEATING DEVICE

The present invention relates to a gas burner of the type in which fuel gas is converted to heat by a catalytic reaction with a gas catalytic combustion element. In particular, the invention relates to a gas burner of the type which is suitable for but is not limited to use in a soldering iron, a glue gun, a clothes pressing iron, a hair curling tongs, a heated hair curler, a hot gas blower for blowing a hot stream of gases, for use, in for example, shrinking an insulating sleeve of plastics material onto electrical connectors, and the like. The invention also relates to a gas powered heating device, and to a method for igniting a gas catalytic combustion element of a gas burner.

Gas powered heating devices, for example, a gas powered soldering iron, a glue gun, a clothes pressing iron, a curling tongs, a heated hair curler, and the like, as well as a hot gas blower are known, and in general, comprise a gas burner which comprises a combustion chamber within which a gas catalytic combustion element is located. A fuel gas/air mixture is delivered into the combustion chamber to pass over, along and/or through the catalytic combustion element so that the fuel gas/air mixture is converted to heat by a catalytic reaction in the catalytic element. Such gas catalytic combustion elements will be well known to those skilled in the art. However, one disadvantage of such gas burners is that initially in order to initiate the catalytic reaction in the catalytic combustion element, the catalytic element must be raised to its ignition temperature. This, in general, requires burning the fuel gas/air mixture in a flame adjacent the catalytic element so that the flame plays on the catalytic element, thus raising the temperature of the catalytic element to its ignition temperature. However, in order that the catalytic combustion element commences to convert the fuel gas/air mixture to heat by the catalytic reaction, the flame must be extinguished so that the fuel gas/air mixture is then played directly onto the catalytic element.

In such devices, in general, a gas jet device is located upstream of the catalytic combustion element relative to the flow of fuel gas/air mixture, and a spark ignition mechanism, typically, ignition electrodes are provided for igniting the fuel gas/air mixture from the jet device to burn in a flame upstream of the catalytic element, so that the flame plays on the catalytic element. The flame raises the catalytic element to its ignition temperature. A piezo electric igniter is typically provided for applying an appropriate voltage to the ignition electrodes for igniting the fuel gas/air mixture.

Various mechanisms are provided for extinguishing the flame after the catalytic element has been raised to its ignition temperature. One such mechanism requires closing an air intake into an area where the fuel gas/air mixture is being burnt in a flame for starving the flame of oxygen, and thus extinguishing the flame. Another mechanism requires closing an air intake through which air is drawn for mixing with the fuel gas for forming the fuel gas/air mixture so that only fuel gas is delivered to the jet, which thus extinguishes the flame.

An alternative mechanism for extinguishing the flame is disclosed in PCT Specification No. WO 95/02788. This PCT Specification discloses a gas powered soldering iron in which a fuel gas/air mixture is converted to heat by a catalytic reaction with a catalytic combustion element which is located in a combustion chamber of the soldering iron. The combustion chamber is located adjacent the soldering tip so that heat generated in the combustion chamber is conducted to the soldering tip. The temperature of the catalytic combustion element is initially raised to its ignition temperature by burning the fuel gas/air mixture in a flame upstream of the catalytic combustion element, and the flame is played on the catalytic combustion element. The flame is extinguished by means of a mechanism which interrupts the flow of fuel gas to a jet from which the fuel gas/air mixture is burnt in the flame. The interruption of gas is for a momentary period only, however, it is sufficient for the purpose of extinguishing the flame.

Such soldering irons and other gas powered heating devices which comprise an ignition mechanism which requires burning a fuel gas/air mixture in a flame for raising the temperature of the catalytic combustion element to its ignition temperature suffer from a number of disadvantages. In such devices where a mechanism for extinguishing the flame is to be operated by the user of the device, in general, the user must determine when the flame should be extinguished, in other words, when the catalytic element has reached its ignition temperature. In the event of such gas powered heating devices comprising a control switch or switches for igniting the fuel gas/air mixture to burn in the flame and for extinguishing the flame, it is important that the switch or switches be timed so that the flame is not extinguished prematurely, in other words, is not extinguished prior to the catalytic element reaching its ignition temperature. This, is not always possible to achieve, and in many instances, many attempts are required in order to operate such heating devices to raise the temperature of the catalytic element to its ignition temperature. This needless to say is undesirable.

Additionally, in devices which comprise one or more control switches for operating the flow of fuel gas, the ignition mechanism, and a mechanism for extinguishing the flame, in general, a number of operations must be carried out by the operator for igniting the fuel gas/air mixture to burn in the flame, and then for interrupting the flow of fuel gas, air or oxygen to extinguish the flame. This likewise is undesirable and may require that many attempts be made in order to raise the temperature of the catalytic element to its ignition temperature.

In typical gas powered heating devices, a switch may be located in the handle, which must be moved to a number of different positions for operating the flow of fuel gas and for raising the temperature of the catalytic element to is ignition temperature. For example, firstly, the switch is moved to a first position for switching on the fuel gas supply to the catalytic combustion element. The switch is then moved to a second position for operating the ignition mechanism for igniting the fuel gas to burn in the flame. The switch is then moved to a third position for interrupting the flow of fuel gas, air or oxygen for extinguishing the flame, and then, to a fourth position for providing a continuous supply of fuel gas to the catalytic element. This, requires considerable skill and dexterity on behalf of an operator, and furthermore, as mentioned above unless the timing of the switch is such to ensure that the flame is not extinguished prior to the catalytic element reaching its ignition temperature, many attempts may be necessary in order to raise the catalytic element to its ignition temperature. Indeed, in many cases, a number of switches are required, and it is necessary for the operator to operate the switches in a particular sequence, and also, to a particular timing schedule. This, is unsatisfactory.

Another arrangement for igniting a catalytic element is of the type which is typically used in a heated hair curling tongs or brush. In such an arrangement, the catalytic element is raised to its ignition temperature by being subjected to a momentary flame which is caused by exploding fuel gas adjacent the catalytic element, typically in a chamber formed within a hair receiving barrel of the curling tongs within which the catalytic element is located. However, because the momentary flame is not sustainable, it is only capable of providing a limited quantity of heat energy, and therefore a low thermal mass catalytic element is required. The low thermal mass catalytic element may be provided on its own and would have sufficient heat output capacity for heating the hair curling tongs, or alternatively, the low thermal mass catalytic element may be provided in conjunction with an adjacently located high thermal mass catalytic element. The high thermal mass catalytic element provides the necessary heat output for the curling tongs, while the low thermal mass catalytic element is provided for raising the temperature of the high thermal mass catalytic element to its ignition temperature. In curling tongs and other devices which are provided with a high thermal mass catalytic element in conjunction with a low thermal mass catalytic element, the low thermal mass catalytic element is raised to its ignition temperature by the momentary flame, which then commences to convert fuel gas/air mixture to heat by a catalytic reaction, and in turn raises the temperature of the high thermal mass catalytic element to its ignition temperature, which then commences and continues to convert fuel gas/air mixture to heat by a catalytic reaction for heating the curling tongs.

A disadvantage of such ignition arrangements, irrespective of whether the low thermal mass catalytic combustion element is provided on its own or in conjunction with a high thermal mass catalytic element, is that the low thermal mass catalytic element must be accurately selected and sized to be of a thermal mass which is capable of being raised to its ignition temperature by the limited heat energy available from the momentary flame. This, can be difficult under normal production conditions. A further disadvantage of such ignition arrangement is that the low thermal mass catalytic element, in general, deteriorates with age, and indeed as a result of normal wear and tear. On deterioration, the ignition temperature of such low thermal mass catalytic elements, in general, tends to rise. This, thus, requires a greater heat energy input in order to raise the low thermal mass catalytic element to its ignition temperature. Since the momentary flame is not sustainable the available heat energy output from the flame is insufficient to ignite the low thermal mass catalytic element thus, leading to failure of the curling tongs. Initially, the low thermal mass catalytic element may be ignited after many attempts by subjecting the low thermal mass catalytic element to the momentary flame a number of times, however, as the low thermal mass catalytic element continues to deteriorate in general, it becomes impossible to raise it to its ignition temperature. The low thermal mass catalytic element can deteriorate relatively rapidly by normal wear and tear, particularly, where the heating device be it a curling tongs or otherwise is operated in a harsh environment, for example, in the case of a curling tongs, where it may be subjected to hair lacquer or other hair sprays, or indeed, where the quality of the fuel gas used is relatively poor. Thus, such ignition arrangements are similarly unsatisfactory.

There is therefore a need for a gas burner in which gas is converted to heat in a gas catalytic combustion element, and in which the gas catalytic combustion element is raised to its ignition temperature by initially burning the fuel gas mixture in a flame for heating the catalytic element, and in which the flame is extinguished without the need for further operator intervention, and on the flame being extinguished, the fuel gas/air mixture is converted to heat by the catalytic action of the catalytic element.

The present invention is directed towards providing such a gas burner, and the invention is also directed towards providing a gas powered heating device which comprises such a gas burner. Further, the invention is directed towards providing a method for igniting a gas catalytic combustion element of a gas burner with the minimum amount of operator intervention.

According to the invention there is provided a gas burner comprising a gas catalytic combustion element for receiving fuel gas and for converting the fuel gas to heat by a catalytic reaction, and an ignition means for igniting the fuel gas to burn in a flame for raising at least a portion of the catalytic element to its ignition temperature wherein the ignition means ignites the fuel gas to burn in the flame which is located relative to the catalytic element so that as the catalytic element progressively reaches its ignition temperature, the flame is starved of fuel gas and is thereby extinguished, so that the catalytic element continues to convert fuel gas to heat by a catalytic reaction.

Preferably, the ignition means ignites the fuel gas to burn in the flame in a location downstream of an upstream portion of the catalytic element relative to the direction of flow of a fuel gas stream to the catalytic element, the upstream portion of the catalytic element being located adjacent the fuel gas stream upstream of the flame for converting the fuel gas of the fuel gas stream to heat on the upstream portion being raised to the ignition temperature, thereby starving the flame of fuel gas.

In one embodiment of the invention an isolating means is provided, the isolating means being alternately operable in an isolating mode and a communicating mode for respectively isolating and communicating a fuel gas supply with the catalytic element, and an operating means is provided for alternately operating the isolating means in the isolating and communicating modes, and for operating the ignition means for igniting the fuel gas to burn in a flame.

In another embodiment of the invention the operating means operates the isolating means and the ignition means sequentially, the isolating means being operated first from the isolating mode to the communicating mode for communicating the catalytic element with the fuel gas supply. Preferably, the isolating means and the ignition means are operated by a single movement of the operating means in one direction.

In one embodiment of the invention the operating means is moveable between an off position in which the isolating means is operated in the isolating mode and an on position in which the isolating means is operated in the communicating mode, and movement of the operating means from the off position to the on position operates the ignition means for igniting the fuel gas to burn in a flame.

In another embodiment of the invention the operating means is a thumb operated slider member which is slidable between the off and the on positions.

In a further embodiment of the invention a handle extends from the gas burner, and the operating means is mounted on the handle. Preferably, the handle is an elongated handle, and the operating means is moveable in a general longitudinal direction relative to the handle.

In an alternative embodiment of the invention the operating means comprises a first operating means for operating the isolating means, and a second operating means for operating the ignition means, the first operating means being operable between the off position and the on position for operating the isolating means in the isolating mode and the communicating mode, respectively, and the second operating means being operable between a rest position and an activating position for activating the ignition means for igniting the fuel gas to burn in a flame.

Advantageously, the first and the second operating means are located in the handle. Preferably, the first operating means and the second operating means are operable independently of each other.

In one embodiment of the invention the first operating means is operable from the off position to the on position in a single movement in one direction, and is operable from the on position to the off position in a return reverse direction.

In another embodiment of the invention the first operating means comprises a thumb operated slider member which is slidable between the off position and the on position.

In a further embodiment of the invention the second operating means is operable from the rest position to the activating position in a single movement in one direction, and is operable from the activating position to the rest position in a return reverse direction. Preferably, the second operating means is urged into the rest position from the activating position by an urging means. Advantageously, the second operating means comprises a thumb operated slider member which is slidable between the rest position and the activating position.

In a further embodiment of the invention a combustion chamber housing is provided, the combustion chamber housing forming a combustion chamber, and the catalytic element is located in the combustion chamber, the fuel gas being burnt in a flame in the combustion chamber.

Preferably, the combustion chamber is an elongated combustion chamber extending between an upstream end and a downstream end relative to the direction of flow of the fuel gas stream, the catalytic element extending into the combustion chamber from the upstream end thereof. Advantageously, the ignition means is located adjacent the combustion chamber. Preferably, the ignition means is located within the combustion chamber.

In one embodiment of the invention the ignition means is located adjacent the upstream end of the combustion chamber.

In one embodiment of the invention the ignition means comprises an ignition electrode for forming a spark on a voltage being applied thereto for igniting the fuel gas to burn in a flame.

Preferably, the catalytic element is an elongated element formed by a side wall which defines and extends around a longitudinally extending central axis, and which defines a hollow core within which the fuel gas is burnt in a flame. Preferably, the side wall of the catalytic element extends completely around the central axis. Advantageously, a portion of the side wall of the catalytic element extends upstream of the location at which the fuel gas burns in a flame for forming the upstream portion of the catalytic element.

In one embodiment of the invention the upstream portion of the side wall of the catalytic element terminates in an upstream plane which extends transversely of the central axis, and the ignition electrode extends into hollow core defined by the catalytic element through the upstream plane.

Preferably, the ignition electrode terminates in an electrode tip in the hollow core of the catalytic element at a position intermediate the upstream and downstream ends thereof.

In one embodiment of the invention the ignition electrode tip is disposed adjacent the upstream plane defined by the catalytic element such that the flame is ignited in the hollow core downstream of the upstream plane.

In another embodiment of the invention the ignition electrode terminates at a location just slightly spaced apart from the upstream plane.

Preferably, the fuel gas is delivered into the hollow core of the catalytic element at the upstream end thereof.

In one embodiment of the invention the catalytic element is located in the combustion chamber for facilitating the flow of fuel gas from the upstream end to the downstream end along both an inner surface and an outer surface of the side wall of the catalytic element.

Preferably, the ignition electrode defines with the side wall of the catalytic element an annular aperture at the upstream end thereof through which fuel gas passes into the hollow core of the catalytic element.

Advantageously, a stabilising means is provided for stabilising the flame for preventing the flame from burning upstream of the catalytic element.

In one embodiment of the invention the stabilising means is located within the hollow core of the catalytic element.

In another embodiment of the invention the ignition electrode cooperates with the catalytic element for forming the stabilising means.

In a further embodiment of the invention the ignition electrode is centrally located in the hollow core of the catalytic element, and the radial width of the annular aperture defined by the ignition electrode with the catalytic element in a radial direction between the ignition electrode and the side wall of the catalytic element is such as to prevent the flame burning upstream of the position at which the ignition electrode terminates in the hollow core of the catalytic element.

In another embodiment of the invention the stabilising means further comprises a diffuser which is located in the fuel gas stream upstream of the position at which the ignition electrode terminates for delivering the fuel gas through the annular aperture between the ignition electrode and the catalytic element for causing the fuel gas to burn in a carousel of corona type flames around and downstream of the ignition electrode tip. Preferably, the diffuser extends transversely of the fuel gas stream, and defines a plurality of fuel gas channels located at circumferentially spaced apart intervals around the central axis defined by the catalytic element for forming the carousel of corona type flames.

In one embodiment of the invention the diffuser is coated with a catalytic combustion material for converting the fuel gas to heat on being raised to its ignition temperature for starving the flame of fuel gas.

Alternatively, the stabilising means comprises a stabilising membrane extending transversely across the hollow core of the catalytic element, the stabilising membrane being porous and being coated with a catalytic combustion material. Preferably, the stabilising membrane is located intermediate the upstream and downstream ends of the catalytic element.

In a further embodiment of the invention the stabilising means comprises a gas diffuser which is located in the fuel gas stream.

Preferably, the side wall of the catalytic element is a cylindrical side wall.

Advantageously, the combustion chamber housing comprises a side wall which defines a longitudinally extending central axis which coincides with the central axis defined by the catalytic element, and the side wall extends around the central axis for forming the combustion chamber. Ideally, the combustion chamber is of circular transverse cross-section.

Preferably, an exhaust means for exhausting burnt gases from the combustion chamber is located at the downstream end of the combustion chamber. Advantageously, the exhaust means is located adjacent the downstream end of the catalytic element.

Ideally, the exhaust means is located downstream of the catalytic element, and preferably, the exhaust means comprises an exhaust port extending from the combustion chamber through the combustion chamber housing. Advantageously, the exhaust port extends radially outwardly from the combustion chamber through the combustion chamber housing.

In one embodiment of the invention the exhaust means is located for facilitating exiting of exhaust gases from the combustion chamber so that the exhaust gases from the combustion chamber form a working stream of hot gases. Preferably, the exhaust means comprises a hot gas outlet port which extends from the combustion chamber coaxially with the central axis for forming the working stream of hot gases.

In one embodiment of the invention the combustion chamber housing is of heat conductive material.

In one embodiment of the invention a working body member of heat conductive material is provided, the working body member cooperating with the catalytic element for receiving heat therefrom for heating the working body member. Preferably, the working body member is in heat conducting engagement with the combustion chamber housing.

In one embodiment of the invention the working body member comprises a soldering tool tip.

In another embodiment of the invention the working body member comprises a glue accommodating housing of a glue gun for receiving and dispensing glue.

In a further embodiment of the invention the working body member comprises a hot plate of clothes iron.

In a still further embodiment of the invention the working body member comprises a housing of a hair curling tongs for curling hair.

In a still further embodiment of the invention the working body member comprises a housing of a hair curler for curling hair.

Preferably, a flame damping means is disposed in the combustion chamber adjacent the exhaust means for preventing a flame exiting through the exhaust means when the fuel gas is being burnt in a flame. Advantageously, the flame damping means comprises a wire mesh screen. Ideally, the flame damping means diminishes the flame upon ignition of the fuel gas, and preferably, the flame damping means glows when heated for indicating ignition of the fuel gas.

Alternatively, the flame damping means comprises a damping rod extending into the combustion chamber adjacent the exhaust means. Preferably, the damping rod is of heat conductive material, and extends from the working body member into the combustion chamber for conducting heat therefrom to the working body member. Advantageously, the damping rod extends coaxially into the combustion chamber.

In a further embodiment of the invention the ignition means comprises a piezo electric igniter for applying a voltage to the ignition electrode, the piezo electric igniter being operably associated with the operating means.

Additionally the invention provides a gas powered heating device comprising the handle, and the gas burner according to the invention, the gas burner extending from and being connected to the handle, the isolating means being located in the handle, and the operating means being located in the handle and being operably associated with the isolating means for alternately operating the isolating means in the isolating mode and the communicating mode, and the operating means being operably associated with the ignition means for operating the ignition means for igniting the fuel gas to burn in the flame.

In one embodiment of the invention the operating means is operable between the off position with the isolating means in the isolating mode and the on position with the isolating means in the communicating mode.

In one embodiment of the invention the isolating means is responsive to the operating means having been moved from the off position for communicating the gas burner with the fuel gas supply, and the ignition means is responsive to the operating means being moved from the off position to the on position so that the ignition means is not operated until after the isolating means communicates the gas burner with the fuel gas supply.

In another embodiment of the invention a mixing means is provided for mixing air with the fuel gas from the isolating means for delivering a fuel gas/air mixture to the gas burner.

In a further embodiment of the invention a fuel gas reservoir is located in the handle from which fuel gas is supplied to the gas burner, the isolating means cooperating with the fuel gas reservoir for alternately isolating and communicating the gas burner and the fuel gas reservoir.

Preferably, the isolating means is mounted in the handle.

In one embodiment of the invention the ignition means further comprises a power source. Preferably, the power source of the ignition means is mounted in the handle.

In one embodiment of the invention the handle is an elongated handle, and the gas burner extends from the handle. Preferably, the gas burner extends in a general longitudinal direction from the handle. Advantageously, the handle defines a longitudinally extending central axis, which substantially coincides with the central axis of the catalytic element.

Further the invention provides a method for igniting a gas catalytic combustion element of a gas burner, the method comprising the steps of igniting fuel gas being delivered to the combustion element to burn in a flame so that the flame heats the catalytic element for raising the catalytic element to its ignition temperature so that the catalytic element commences to convert fuel gas to heat, eventually starving the flame of fuel gas for extinguishing the flame.

In one embodiment of the invention the fuel gas is ignited to burn in a flame downstream of at least an upstream portion of the catalytic element.

In another embodiment of the invention the upstream portion of the catalytic element is located upstream of the flame.

In a further embodiment of the invention the fuel gas is ignited by an ignition means, and fuel gas is delivered to the catalytic element through an isolating means for alternately isolating and communicating the catalytic element with a fuel gas supply, the method comprising sequentially operating the isolating means for communicating the catalytic element with the fuel gas supply and the ignition means for igniting the fuel gas to burn in the flame.

The advantages of the invention are many. One of the most important advantages of the invention is that there is no need for a separate mechanism for extinguishing the flame after the catalytic element has been raised to its ignition temperature. The flame is extinguished automatically on being starved of fuel gas/air mixture. This has the advantages that there is no need to provide switch mechanisms for switching on and off the fuel gas, or interrupting the supply of fuel gas or air to the combustion chamber after the catalytic element has reached its ignition temperature. Thus, complex timing arrangements for timing the period while the fuel gas/air mixture is to burn with a flame are eliminated. Additionally, complex sequences of operation of switches for initially igniting the fuel gas to burn in a flame, and then extinguishing the flame are also eliminated. The gas burner may be operated by a single control switch which controls the supply of fuel gas to the catalytic element, and operates the ignition means sequentially as the control switch is being moved from an off to an on position. Further advantages of the invention are that the gas burner is of relatively simple and inexpensive construction, and additionally, when the gas burner is fitted to a gas powered heating device, for example, a gas powered heating tool such as, for example, a soldering iron, a hot gas blower and the like a relatively simple construction of device is provided. The various embodiments of the invention provide other advantages, which will be readily apparent to those skilled in the art, and some of which are indicated below.

Figure 16:
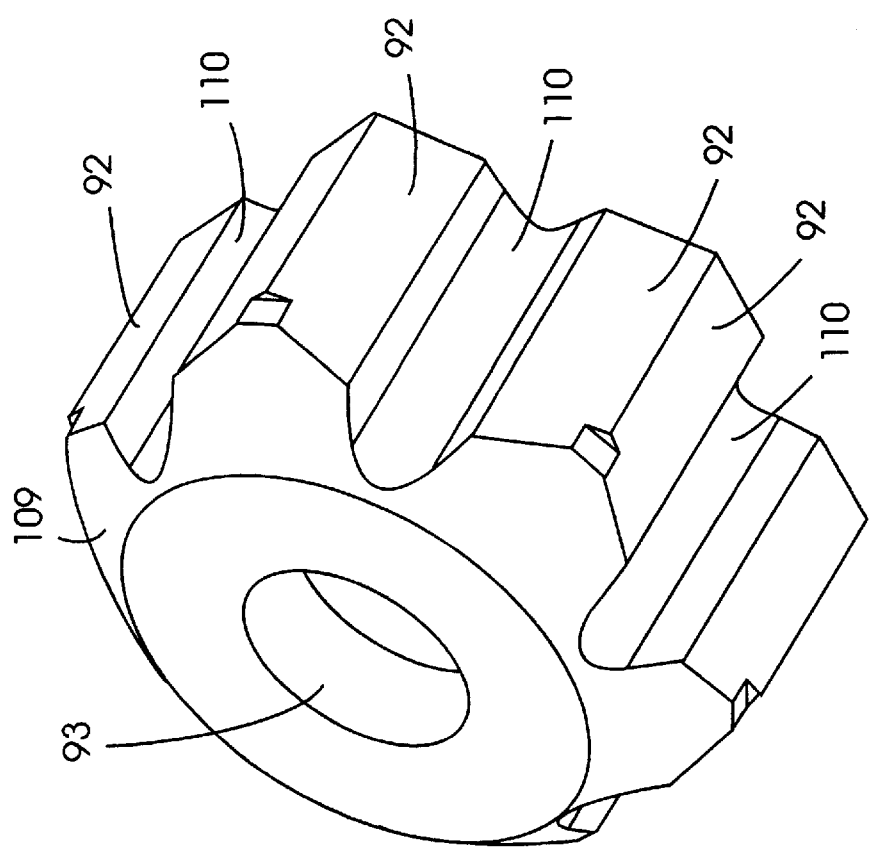
Figure 14:
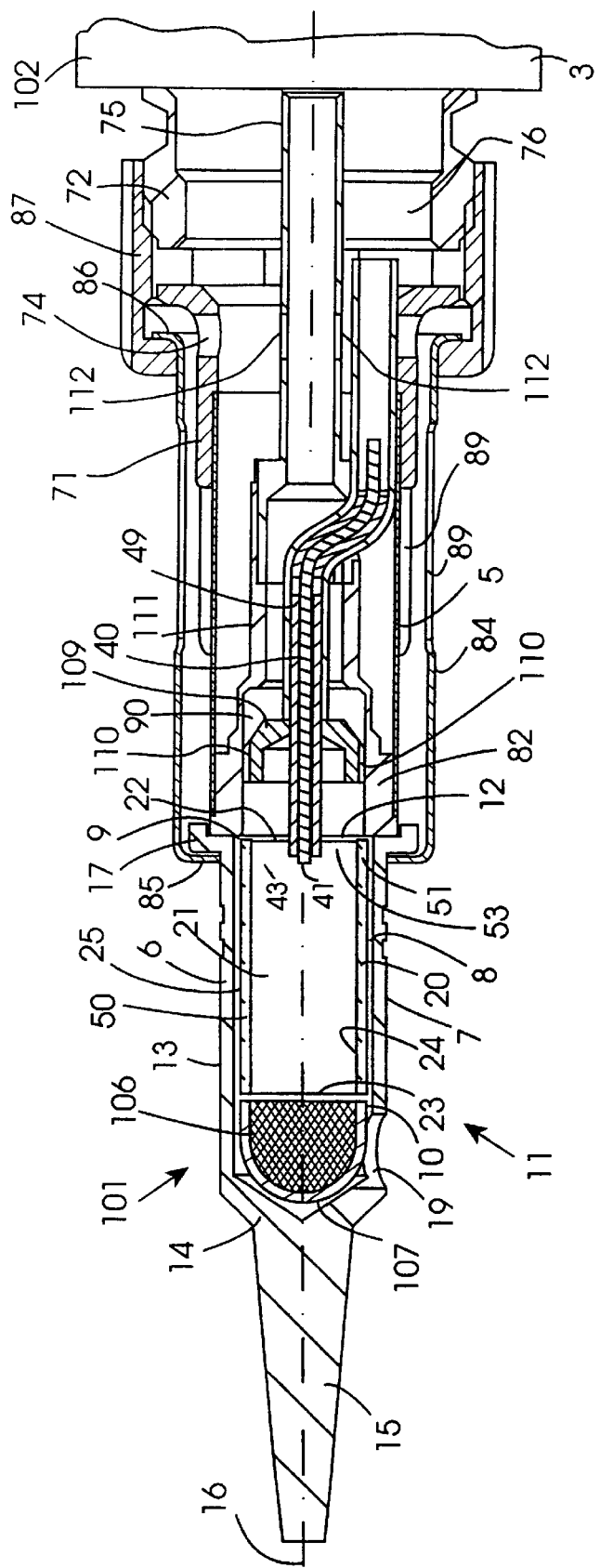
Figure 15:
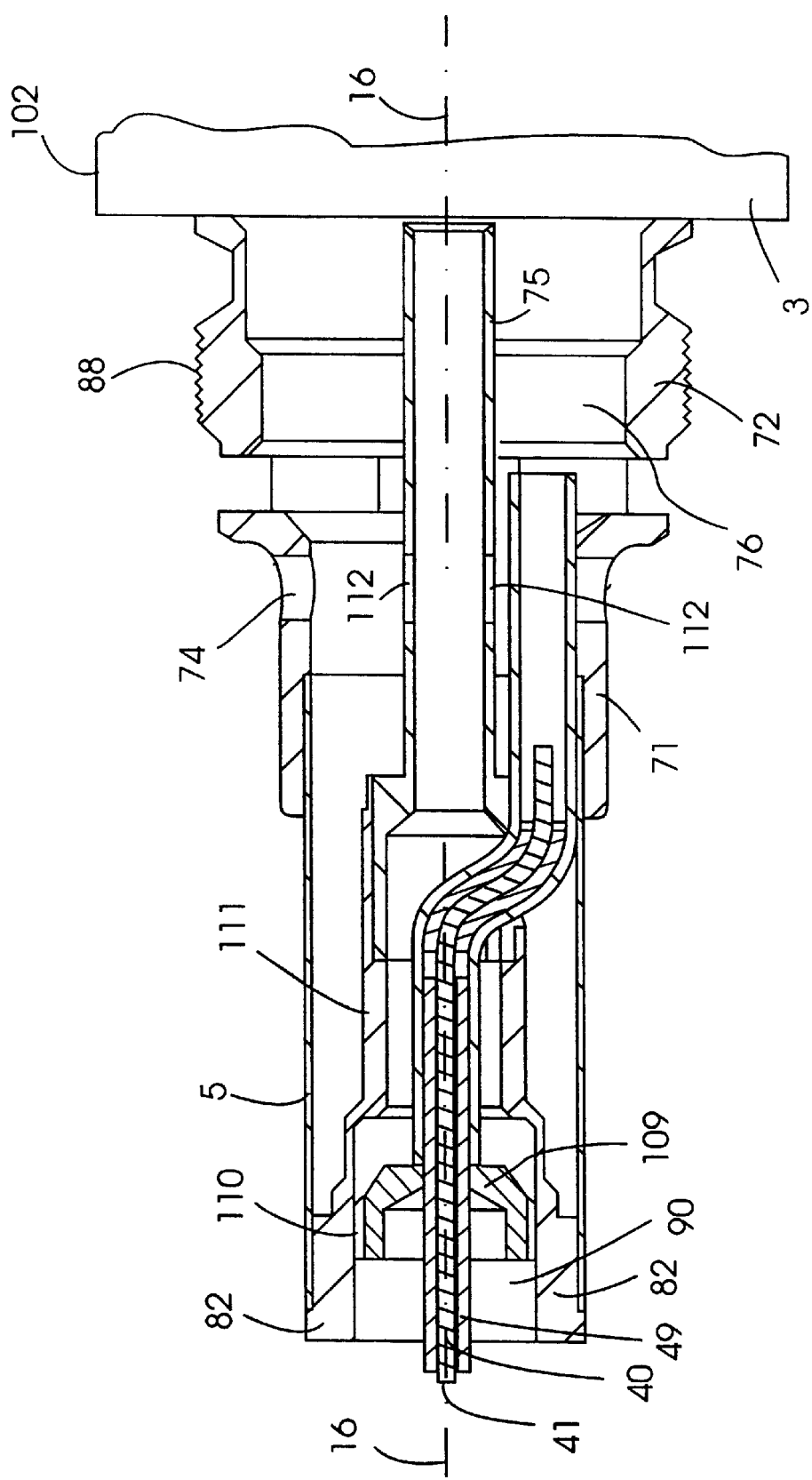
Figure 17:
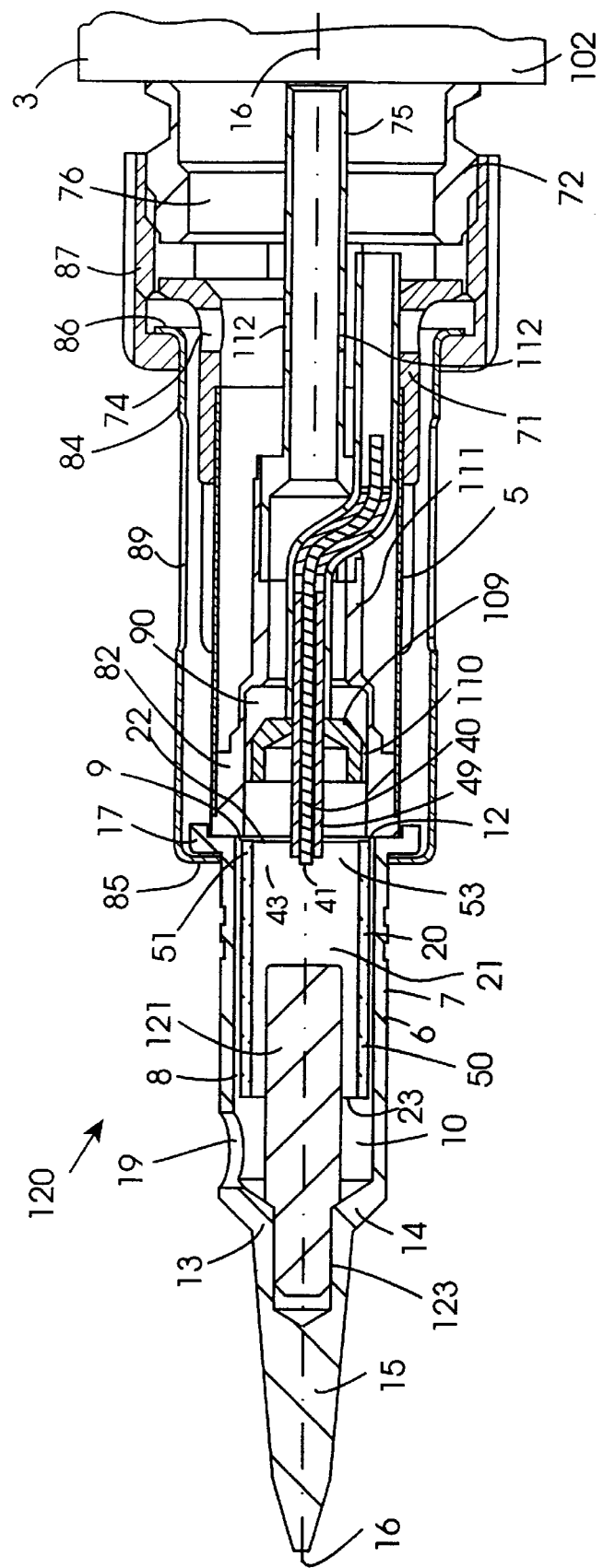
Figure 18:
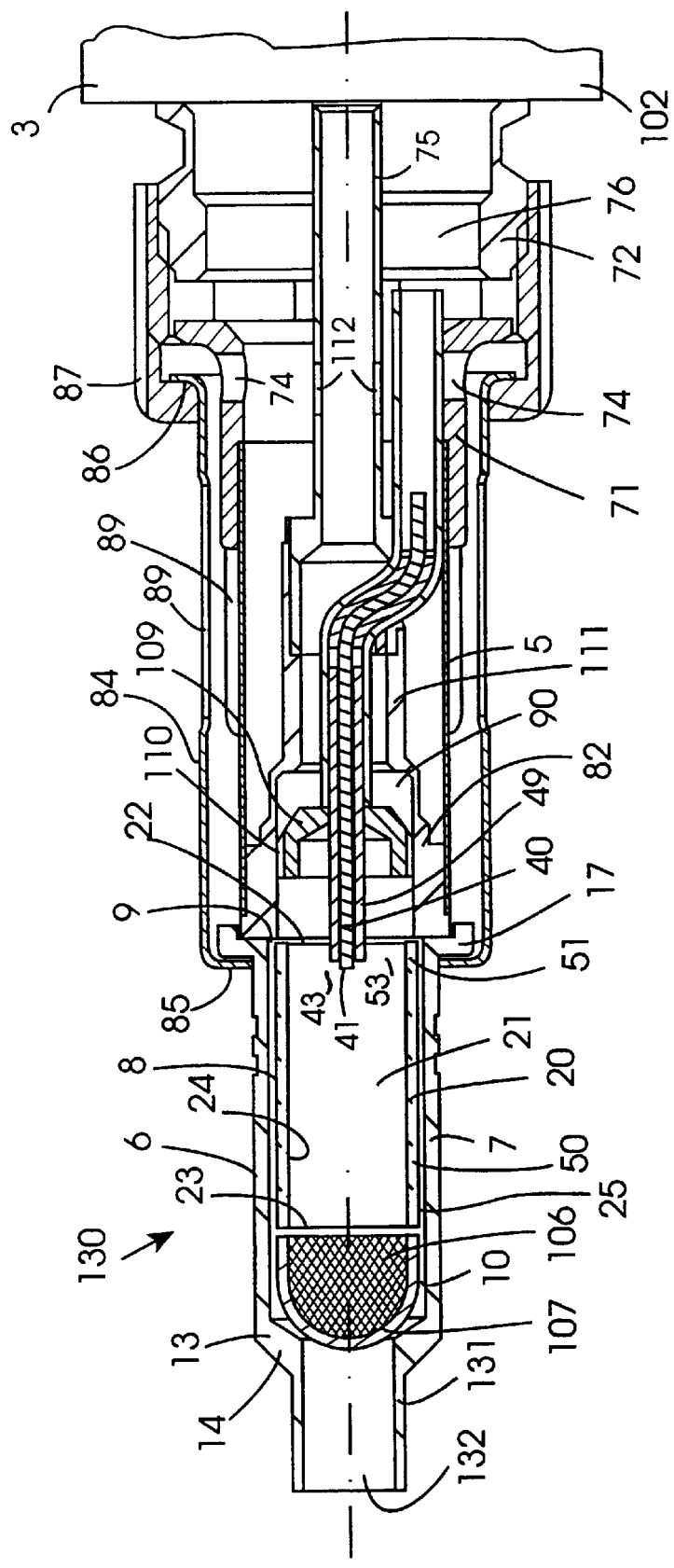

The invention will be more clearly understood from the following description of some preferred embodiments thereof which are given by way of example only with reference to the accompanying drawings, in which:

FIG. 1 is a partly sectional side elevational view and a partly diagrammatic/block representational view of a gas powered heating device, namely, a soldering iron according to the invention, FIG. 2 is a sectional side elevational view of a portion of a soldering iron of FIG. 1, FIG. 3 is a sectional plan view on the line III—III of the portion of the soldering iron of FIG. 2, FIG. 4 is a view similar to FIG. 2 of a similar portion of a soldering iron according to another embodiment of the invention, FIG. 5 is a view similar to FIG. 3 of the portion of the soldering iron of FIG. 4 on the line V—V of FIG. 4, FIG. 6 is a perspective view of a portion of a soldering iron according to a further embodiment of the invention, FIG. 7 is a perspective view of the portion of the soldering iron of FIG. 6 from a different direction, FIG. 8 is a sectional side elevational view of the portion of the soldering iron of FIG. 6, FIG. 9 is a sectional side elevational view of the portion of the soldering iron of FIG. 6 on the line IX—IX of FIG. 8, FIG. 10 is a sectional plan view of a detail of the soldering iron of FIG. 6 on the line X—X of FIG. 8, FIG. 11 is a sectional side elevational view of a detail of the portion of the soldering iron of FIG. 6, FIGS. 12(*a*) to (*d*) are various views of another detail of the portion of the soldering iron of FIG. 6, FIG. 13 is a view similar to FIG. 1 of a soldering iron according to a further embodiment of the invention, FIG. 14 is a view similar to FIG. 8 of a portion of the soldering iron of FIG. 13, FIG. 15 is an enlarged sectional elevational view of a detail of the soldering iron of FIG. 13, FIG. 16 is a perspective view of another detail of the soldering iron of FIG. 13, FIG. 17 is a view similar to FIG. 8 of a portion of a soldering iron according to another embodiment of the invention, and FIG. 18 is a view similar to FIG. 8 of a portion of a gas powered heating device, which in this case may be used as a hot gas blower for heating an article.

Referring to the drawings, and initially to FIGS. 1 to 3 there is illustrated a gas powered heating device according to the invention, which in this case is a soldering iron which is indicated generally by the reference numeral 1. The soldering iron 1 comprises an elongated handle 2 formed by an elongated tubular handle housing 3 of circular transverse cross-section of injection moulded plastics material. The handle 2 is illustrated in schematic block representation only in FIG. 1. A soldering head 4 is connected to the handle housing 3 by a stainless steel tubular member 5 of circular transverse cross-section. The general construction and shape of the handle 2, and the connection of the tubular member 5 to the handle 2 is substantially similar to that of the soldering iron which is illustrated and described in European Patent Specification No. EP-A-0,118,282.

The soldering head 4 comprises a main body member 13 which is of a heat conductive material, namely, nickel plated copper, and is formed in one piece by machining. The main body member 13 comprises a combustion chamber housing 6 having a cylindrical side wall 7 which forms an elongated cylindrical combustion chamber 8. The combustion chamber 8 extends from an upstream end 9 to a downstream end 10 and which forms a gas burner 11. The upstream end 9 of the combustion chamber housing 6 forms a circular opening 12 through which a fuel gas/air mixture is delivered to the combustion chamber 8 as will be described below. The downstream end 10 of the combustion chamber 8 is closed by a solid portion 14 which is tapered and terminates in a working body member, namely, an elongated soldering tip 15. The side wall 7 defines a longitudinally extending central axis 16, about which the soldering head 4 is symmetrical. A radially extending circumferential flange 17 at the upstream end 9 of the combustion chamber housing 6 is engagable by a gland nut 18 of stainless steel for securing the soldering head 4 to the tubular member 5. An exhaust means for exhausting exhaust gases from the combustion chamber 8 comprises a pair of exhaust ports 19 which extend radially through the side wall 7 at the downstream end 10, and are located spaced apart around the combustion chamber housing 6 at 180° intervals.

A gas catalytic combustion element 20 is located in the combustion chamber 8 for converting the fuel gas/air mixture to heat by a catalytic reaction for heating the combustion chamber housing 6, and in turn the soldering tip 15. The catalytic element 20 is formed of a metal mesh substrate which is coated with a suitable catalytic material, and is of cylindrical shape defining an elongated hollow core 21 of circular transverse cross-section. The catalytic element 20 also defines a longitudinally extending central axis which coincides with the central axis 16 of the combustion housing 6. The catalytic element 20 extends into the combustion chamber 8 from an upstream end 22 which substantially coincides with the upstream end 9 of the combustion chamber 8 to a downstream end 23 towards the downstream end 10 of the combustion chamber 8. The upstream end 22 of the catalytic element 20 lies in a plane which extends transversely of the central axis 16, and to which the central axis 16 extends substantially perpendicularly therefrom. The fuel gas/air mixture is delivered to the catalytic element 20 through the opening 12 at the upstream end 9 of the combustion chamber 8, and the catalytic element 20 is located in the combustion chamber 8 so that the fuel gas/air mixture passes along an inner surface 24 of the catalytic element 20, and along an outer surface 25 of the catalytic element 20 between the catalytic element 20 and the cylindrical side wall 7 of the combustion chamber housing 6 for efficient catalytic conversion.

A rechargeable fuel gas reservoir 30 which is illustrated in block representation in FIG. 1 is located in the handle housing 3, and a regulator 31 also illustrated in block representation in FIG. 1 is located in the handle housing 3 for regulating the pressure and flow rate of fuel gas from the reservoir 30. A regulator knob 32 is rotatably mounted at the end of the handle housing 3 and is mechanically connected to the regulator 31 by a connecting shaft 33 which is illustrated in line representation in FIG. 1 for operating the regulator 31 for controlling the pressure and flow rate of fuel gas exiting from the reservoir 30. An isolating means, namely, an isolating valve 35 is located within the handle housing 3, and a regulated fuel gas supply from the regulator 31 is delivered to the combustion chamber 8 through the isolating valve 35. The isolating valve 35 is alternately operable in an isolating mode and communicating mode for alternately isolating and communicating the combustion chamber 8 and the fuel gas supply from the regulator 31.

An operating means comprising a thumb operated slider member 36 is slidably mounted in the handle housing 3 for alternately operating the isolating valve 35 in the respective isolating and communicating modes. The slider member 36 is slidable longitudinally in the handle housing 3 in the direction of the arrow A from an off position illustrated in full lines in FIG. 1 for operating the isolating valve 35 in the isolating mode, to an on position illustrated in broken lines in FIG. 1 for operating the isolating valve 35 in the communicating mode. The slider member 36 is slidable in the reverse direction, namely, in the direction of the arrow B from the on position to the off position, for again isolating the combustion chamber 8 from the regulator 31. A connecting mechanism 37 illustrated in line representation only in FIG. 1 operably connects the slider member 36 with the isolating valve 35. The isolating valve 35 delivers fuel gas through a connecting pipe 38 to a fuel gas/air mixing means, namely, a venturi type fuel gas/air mixer 39 which is illustrated in block representation in FIG. 1, and which is located in the tubular member 5. Fuel gas/air mixture is delivered from the venturi mixer 39 through the tubular member 5 into the combustion chamber 8. The construction of such venturi mixers, isolating valves, regulators, reservoirs and slider members, as well as the connecting mechanism 37 for connecting the first slider member 36 to the isolating valve 35 and the shaft 33 for connecting the regulator knob 32 to the regulator 31 will be well known to those skilled in the art, and are substantially similar to those described in the soldering iron of European Patent Specification No. EP-A-0,118,282.

An ignition means for initially igniting the fuel gas/air mixture to burn in a flame 42 in the hollow core 21 of the catalytic element 20 for rising the temperature of the catalytic element 20 to its ignition temperature comprises an ignition electrode 40 which extends into the core 21. The ignition electrode 40 extends centrally along the central axis 16 into the core 21 from the upstream end 22, and terminates in a tip 41 intermediate the upstream end 22 and the downstream end 23 of the catalytic element 20. The electrode tip 41 cooperates with the side wall 7 of the combustion chamber housing 6 for forming a spark between the tip 41 and the side wall 7 for igniting the fuel gas/air mixture to burn in the flame 42 when a voltage is applied across the ignition electrode 40 and the side wall 7. An electrical power source comprising a piezo electric igniter 44 is located in the handle housing 3 for applying the voltage across the ignition electrode 40 and the side wall 7. The slider member 36 is operably associated with the piezo electric igniter 44 through a mechanical linkage 45 which is illustrated in line representation in FIG. 1 so that as the slider member 36 is being moved in the direction of the arrow A from the off position to the on position, the piezo electric igniter 44 is activated for applying the voltage across the ignition electrode 40 and the side wall 7. The mechanical linkage 45 is arranged so that the voltage is applied across the ignition electrode 40 and the side wall 7 as the slider member 36 is approaching the fully on position. The isolating valve 35 commences to deliver fuel gas to the venturi mixer 39 as the slider member 36 commences to move from the off position, and thus sufficient fuel gas accumulates in the core 21 of the catalytic element 20 to be ignited to burn in the flame 42 by the time the spark arcs between the electrode tip 41 and the side wall 7.

The ignition electrode 40 extends through the tubular member 5 and is connected to one output 46 of the piezo electric igniter 44. Another output 47 of the piezo electric igniter 44 is electrically connected to the tubular member 5 by an electrical connector 48. Since the tubular member 5 and the gland nut 18 are of stainless steel which is electrically conductive, electrical continuity is maintained between the output 47 of the piezo electric igniter 44 and the side wall 7. An electrically insulating sleeve 49 of ceramic material extends around the ignition electrode 40 for preventing arcing between the ignition electrode 40 and the side wall 7 or the tubular member 5 upstream of the electrode tip 41.

The electrode tip 41 is located approximately mid way between the upstream end 22 and the downstream end 23 of the catalytic element 20 so that the spark which arcs across a radial spark gap 43 between the electrode tip 41 and the side wall 7 ignites the fuel gas/air mixture to burn in the flame 42 in the core 21 downstream of the electrode tip 41. The flame 42 plays directly on a downstream portion 50 of the catalytic element 20 between the electrode tip 41 and the downstream end 23 which is heated by the flame 42 to its ignition temperature. When the downstream portion 50 of the catalytic element 20 reaches its ignition temperature it begins to convert fuel gas/air mixture flowing along the outer surface 25 to heat. This catalytic reaction rapidly spreads upstream along the catalytic element 20 to an upstream portion 51, thereby rapidly rising the temperature of the upstream portion 51 of the catalytic element 20 to its ignition temperature so that the entire upstream portion 51 commences to convert the fuel gas/air mixture to heat by the catalytic reaction. This catalytic reaction whereby the fuel gas/air mixture upstream of the flame 42 is converted to heat, quickly starves the flame 42 of fuel gas/air mixture, thereby automatically extinguishing the flame. Thereafter the entire catalytic element 20 over its entire length converts the fuel gas/air mixture to heat by the catalytic reaction. Heat from the downstream portion 50 is also conducted to the upstream portion 51 through the catalytic element 20 which further accelerates the rate at which the upstream portion 51 of the catalytic element 20 reaches its ignition temperature.

A stabilising means for stabilising the flame 42 so that the flame 42 is retained within the downstream portion 50 of the catalytic element 20 and is prevented from burning upstream of the electrode tip 41, is provided by the cooperation of the ignition electrode 40 with the catalytic element 20 which together define an annular aperture 53 through which the fuel gas/air mixture passes into the downstream portion 50 of the catalytic element 20. In order words, the insulating sleeve 49 forms the annular aperture 53 between itself and the catalytic element 20, and the radial width of the annular aperture 53 is such as to prevent the flame 42 passing upstream of the electrode tip 41. If the flame 42 were allowed to burn in the hollow core 21 formed by the upstream portion 51 of the catalytic element 20, such a flame would receive sufficient fuel gas/air mixture for its maintenance, and would thus not extinguish automatically. In such a case, the benefit of the invention would not be achieved since there would be no portion of the catalytic element 20 extending upstream of the flame for starving the flame of fuel gas/air mixture. Although the radial spacing between the catalytic element 20 and the side wall 7 of the combustion chamber housing 6 is illustrated in FIGS. 1 to 3 as being relatively large, in practice, the diameter of the catalytic element 20 is such that the catalytic element 20 lies relatively closely to the side wall 7 of the combustion chamber housing 6. The radial spacing between the outer surface 25 of the catalytic element 20 and the side wall 7 of the combustion chamber housing 6 is just sufficient for fuel gas/air mixture to pass between the catalytic element and the side wall 7 for enabling the catalytic reaction of the fuel gas/air mixture with the outer surface 25. However, the radial spacing between the outer surface 25 of the catalytic element 20 and the side wall 7 is sufficiently small for preventing any fuel gas/air mixture in the space between the catalytic element 20 and the side wall 7 igniting to burn in a flame.

In use, the slider member 36 on being urged from the off position in the direction of the arrow A operates the isolating valve 35 for delivering fuel gas to the venturi mixer 39 where the fuel gas is mixed with air to form the fuel gas/air mixture. The fuel gas/air mixture is delivered into the combustion chamber 8, and as the slider member 36 is just about to reach the on position the piezo electric igniter 44 is activated and applies a voltage across the ignition electrode 40 and the side wall 7 of the combustion chamber housing 6 thereby igniting the fuel gas/air mixture to burn in a flame 42 in the hollow core 21 of the catalytic element 20 downstream of the electrode tip 41. The flame 42 playing on the downstream portion 50 of the catalytic element 20 raises the temperature of the downstream portion 50 to its ignition temperature. This causes a catalytic reaction to be set up on the outer surface 25 of the downstream portion 50 whereby the fuel gas/air mixture adjacent the outer surface 25 is converted to heat. This catalytic reaction rapidly spreads upstream along the catalytic element 20 to the upstream portion 51, thereby raising the upstream portion 51 to its ignition temperature. Heat from the downstream portion 50 is also conducted through the catalytic element 20 to the upstream portion 51. On the upstream portion 51 being raised to its ignition temperature the fuel gas/air mixture flowing into the core 21 in the annular passageway 53 reacts with the inner surface 24 of the upstream portion 51 of the catalytic element 20, and is converted to heat by the upstream portion 51. This in turn rapidly starves the flame 42 of fuel gas/air mixture, which extinguishes the flame. When the flame 42 has been extinguished, all the fuel gas/air mixture which is delivered to the catalytic element 20 is converted to heat by the catalytic reaction. Exhaust gases resulting from the catalytic conversion, and in the initial stages, from the flame 42, pass through the exhaust port 19.

The catalytic element 20 continues to convert the fuel gas/air mixture to heat by the catalytic reaction, thereby heating the combustion housing 6, and in turn the soldering tip 15 to the desired working temperature, and maintaining the soldering tip 15 at the desired working temperature. The pressure and flow rate of the fuel gas from the reservoir 30, and in turn the flow rate of the fuel gas/air mixture flowing through the combustion chamber 8 is controlled by the regulator knob 32 which in turn operates the regulator 31. Provided the rate of flow of fuel gas/air mixture over the catalytic element 20 is adjusted to avoid slippage, only exhaust gases exit through the exhaust ports 19.

The soldering iron is switched off by sliding the slider member 36 in the direction of the arrow B to the off position, thereby operating the isolating valve 35 into the isolating mode and isolating the catalytic element 20 from the fuel gas supply in the reservoir 30. This, thus, permits the catalytic element 20 to cool below its ignition temperature, and thus extinguish. When the soldering iron is next required, it is ignited in similar fashion.

Should it be desired to replace the main body member 13 with a new main body member 13, or a main body member 13 having a soldering tip 15 of different size or shape, this can be readily achieved by releasing the gland nut 18. In general, it is envisaged that the catalytic element 20 will be located and mounted within the combustion chamber 8 so that on removal of the main body member 13 the catalytic element 20 remains in the combustion chamber 8. Typically, a plurality of main body members 13 would be provided with different sizes and shapes of soldering tips 15, and all, in general, would be provided with a catalytic element within their respective combustion chambers. It is also envisaged that the main body member 13 may be replaced with a main body member 13 which would terminate in an alternative working body member besides a soldering tip.

Referring now to FIGS. 4 and 5, there is illustrated a soldering head 60 of another soldering iron also according to the invention. The soldering head 60 is substantially similar to the soldering head 4 of the soldering iron 1, and similar components are identified by the same reference numerals. Although not illustrated, a handle comprising a handle housing similar to the handle housing 3 of the soldering iron 1 is connected to and extends from the tubular member 5. The main difference between the soldering head 60 and the soldering head 4 is in the catalytic element 20 and the ignition electrode 40. The catalytic element 20 of the soldering head 60 is of similar material to the catalytic element 20 of the soldering head 4. However, in this embodiment of the invention, the stabilising means for stabilising the flame 42 and for preventing the flame 42 moving upstream in the core 21 of the catalytic element 20 is provided by a stabilising membrane 61 which extends across the core 21, and comprises a porous metal mesh substrate coated with a catalyst similar to the catalytic element 20. The stabilising membrane 61 being of mesh material is permeable for permitting the flow of the fuel gas/air mixture into the downstream portion 50 of the core 21 to burn initially with a flame 42.

The ignition electrode 40 instead of extending centrally through the core 21 of the catalytic element 20 extends into the combustion chamber 8 between the side wall 7 of the combustion housing 6 and the catalytic element 20. The ignition electrode 40 is cranked at 63 and a portion 64 extends through the catalytic element 20 into the core 21 downstream of the stabilising membrane 61. The catalytic element 60 is electrically connected to the side wall 7 of the combustion housing 6, which in turn is electrically connected to the piezo electric igniter (not shown) which is similar to the piezo electric igniter 44 of the soldering iron 1. Since the catalytic element 20 is of metal, and is thus electrically conductive the electrode tip 41 of the ignition electrode 40 cooperates with the catalytic element 20 for forming a spark gap 43 across which a spark is generated by the piezo electric igniter 44 for igniting the fuel gas/air mixture to burn in a flame 42 in the core 21 downstream of the membrane 61. An insulating sleeve 49 which is similar to the insulating sleeve 49 of the ignition electrode 40 of the soldering iron 1 surrounds the ignition electrode 40 of the soldering head 60 for preventing arcing between the electrode 40 and the side wall 7 of the combustion housing 6 and the tubular member 5. Additionally, the insulating sleeve 49 also insulates the ignition electrode 40 from the catalytic element 20 where the electrode 40 passes through the catalytic element 20 into the core 21.

In use, this soldering iron 60 is operated in a substantially similar manner to that of the soldering iron 1 of FIGS. 1 to 3 and on a spark being generated across the spark gap 43 by the action of the slider member (not shown in this case) in the direction of the arrow A nearing the end of its travel towards the on position, the fuel gas/air mixture is ignited and burns in a flame 42 in the downstream portion of the core 21 downstream of the stabilising membrane 61. The flame 42 raises the temperature of the downstream portion 50 of the catalytic element 20 to its ignition temperature, and the fuel gas/air mixture flowing along the outer surface 25 of the catalytic element 20 is converted to heat at the downstream portion 50. The upstream portion 51 of the catalytic element 20 and the stabilising membrane 61 are rapidly raised to their ignition temperature. At this stage the fuel gas/air mixture flowing through the core 21 of the catalytic element 20 upstream of the flame 42 is converted to heat by the catalytic reaction of the stabilising membrane 61 and the upstream portion 51 of the catalytic element 20, thereby starving the flame 42 of fuel gas/air mixture and extinguishing the flame 42.

Otherwise, the soldering iron of this embodiment of the invention is substantially similar to the soldering iron of FIGS. 1 to 3.

Referring now to FIGS. 6 to 12, there is illustrated a soldering head 70 according to another embodiment of the invention of a soldering iron, also according to the invention. The soldering iron of this embodiment of the invention comprises a handle 2 which is formed by a handle housing 3, only the top portion of which is illustrated in FIGS. 8 and 9, but which is similar to the handle housing 3 of the soldering iron 1 which is described with reference to FIGS. 1 to 3. The soldering head 70 comprises a combustion chamber housing 6 which is substantially identical to the combustion chamber housing 6 of the soldering head 1, and for convenience, similar components associated with the combustion chamber housing 6 and the soldering head 70 are identified by the same reference numerals as used in connection with the soldering head 1 of FIGS. 1 to 3.

In this embodiment of the invention the venturi mixer 39 for mixing the fuel gas with air is illustrated in detail and comprises a mixer body member 71 of electrically conductive material, namely, brass which is formed in one piece with a connector member 72 which connects the tubular member 5 to the handle housing 3. A venturi bore 73 within which fuel gas and air are mixed to form the fuel gas/air mixture extends axially and centrally through the mixer body member 71, and delivers the fuel gas/air mixture into the tubular member 5 for delivery in turn into the combustion chamber 8. Air inlet ports 74 extend radially through the mixer body member 71 for delivering air into the venturi bore 73. A fuel gas supply pipe 75 which is connected to the isolating valve (not shown) in the handle housing 3 is located in a communicating bore 76 which extends through the connector member 72. A flange 78 which extends around the supply pipe 75 engages the mixer body member 71 and centrally locates the supply pipe 75. The supply pipe 75 terminates in an orifice plate 79 having a fuel gas outlet orifice 80 through which a jet of fuel gas is delivered into the venturi bore 73 for mixing with the air. A filter 81 is located in the supply pipe 75 adjacent the orifice plate 79 for filtering the fuel gas to the outlet orifice 80.

The tubular member 5 extends from and is a tight fit on the mixer body member 71, and terminates in an annular engagement member 82 of brass onto which it is also a tight fit. The engagement member 82 abuts the flange 17 of the combustion chamber housing 6, and an outer tubular member 84 also of electrically conductive material, namely, stainless steel extends around and along and spaced apart from the tubular member 5. The outer tubular member 84 terminates at one end in an inwardly extending circumferential flange 85 for engaging the flange 17 of the combustion chamber housing 6, and terminates at the other end adjacent the mixer body member 71 in an outwardly extending circumferential flange 86 for cooperating with a gland nut 87 for securing the outer tubular member 84 to the connector member 72, and for in turn sandwiching the flange 17 of the combustion housing 6 between the flange 85 and the engagement member 82. External threads 88 on the connector member 72 engage the gland nut 87. Longitudinally extending air inlet slots 89 are provided at spaced apart intervals around the outer tubular member 84 for accommodating air into the inlet ports 74 between the tubular member 5 and the outer tubular member 84.

In this embodiment of the invention the catalytic element 20 is located in the combustion chamber 8, but part of the upstream portion 51 of the catalytic element 20 extends in an upstream direction out of the combustion chamber 8 and into a fuel gas/air mixture accommodating bore 90 which extends through the annular engagement member 82. The ignition electrode is centrally located in the tubular member 5, and passes centrally through the bore 90 in the engagement member 82 into the hollow core 21 of the catalytic element 20 within the combustion chamber 8. The ignition electrode 40 terminates in the tip 41 which cooperates with the side wall 7 of the combustion chamber housing 6 for forming the spark gap 43 across which a spark arcs.

The stabilising means as well as being provided by the cooperation action of the electrode 40 and the side wall 7 forming the annular aperture 53, also comprises a diffuser member 91 of brass which is located within the catalytic element 20 at the upstream end 22 thereof within the bore 90 of the engagement member 82. The diffuser member 91 is of hexagonal transverse cross-section having outer flats 92 along which the fuel gas/air mixture passes between the diffuser member 91 and the catalytic element 20. In this way the fuel gas flowing into the combustion chamber 8 from the diffuser member 91 burns in a carousel of corona type flames around and downstream of the electrode tip 41 for heating the downstream portion 50 of the catalytic element 20. Some of the fuel gas/air mixture also passes radially through the catalytic element 20 upstream of the electrode tip 41, and passes along the outer surface 25 of the catalytic element 20 as already described with reference to the soldering iron 1 of FIGS. 1 to 3. A central bore 93 extending through the diffuser member 91 centrally locates the ignition electrode 40 in the core 21 of the catalytic element 20. In this embodiment of the invention a single exhaust port 19 extends radially through the side wall 7 of the combustion chamber housing 6 adjacent the downstream end 10 of the combustion chamber 8 for exhausting burnt gases from the combustion chamber 8.

In use, operation of a soldering iron with the soldering head 70 of this embodiment of the invention is similar to the operation of the soldering iron 1. On operation of the slider member which is similar to the slider member 36 of the soldering iron 1 from the off position to the on position, the isolating valve is operated for delivering fuel gas to the venturi bore 73 where the fuel gas is mixed with air and in turn delivered into the combustion chamber 8. As the slider member is just approaching the on position the piezo electric igniter is operated thereby applying a voltage to the ignition electrode 40, and in turn a spark is generated across the spark gap 53. The fuel gas/air mixture already delivered into the core 21 of the catalytic element 20 downstream of the electrode tip 41 is ignited and burns in a carousel of corona type flames. The corona flames heat the downstream portion 50 of the catalytic element 20, and fuel gas on the outer surface 25 of the downstream portion 50 of the catalytic element 20 commences to convert to heat by the catalytic reaction in the catalytic element 20. The catalytic reaction rapidly spreads upstream along the catalytic element 20 to the upstream portion 51 thereby raising the upstream portion 51 of the catalytic element 20 to its ignition temperature. Once the upstream portion 51 of the catalytic element 20 is at its ignition temperature, fuel gas passing between the diffuser member 91 and the catalytic element 20 is converted to heat by the upstream portion 51 of the catalytic element 20, thereby starving the corona flames of the fuel gas/air mixture, and thus extinguishing the flames. Once the corona flames have been extinguished, the catalytic element 20 continues to convert the fuel gas/air mixture to heat by the catalytic reaction.

Referring now to FIGS. 13 to 16 there is illustrated a gas powered heating device, namely, soldering iron 100 according to another embodiment of the invention. The soldering iron 100 is substantially similar to the soldering iron 1, and similar components are identified by the same reference numerals. The soldering iron 100 comprises a soldering head 101 which is substantially similar to the soldering head 70 of FIGS. 6 to 12. A handle 102 extends from the soldering head 101, and is substantially similar to the handle 2 of the soldering iron 1. Accordingly, for convenience components of the soldering head 101 which are similar to the soldering head 70 are identified by the same reference numerals, and components in the handle 102 which are similar to the handle 2 of the soldering iron 1 are also identified by the same reference numerals.

The main difference between the handle 102 and the handle 2 of the soldering iron 1 is that the operating means for operating the isolating valve 35 and the piezo electric igniter 44 comprises a first thumb operated slider member 103 and a second thumb operated slider member 104. The first slider member 103 is similar to the thumb operated slider member 36 but only operates the isolating valve 35. The second slider member 104 is slidably mounted in the handle housing 3 for activating the piezo electric igniter 44 for applying the voltage to the ignition electrode 40 and is operated independently of the first slider member 103. The second slider member 104 is operable connected to the piezo electric igniter 44 by a mechanical linkage 105 which is illustrated in line representation only in FIG. 13, and is slidable in the direction of the arrow C from a rest position illustrated in full lines in FIG. 13 to an activating position illustrated in broken lines in FIG. 13 for activating the piezo electric igniter 44 for applying the voltage to the ignition electrode 40. An urging means provided by spring biasing (not shown) in the mechanical linkage 105 urges the slider member 103 in the direction of the arrow D from the activating position to the rest position for returning the slider member 103 to the rest position.

Turning now to the soldering head 101, in this embodiment of the invention the catalytic element 20 terminates at its upstream end 22 in the combustion chamber 8 adjacent the upstream end 9 of the combustion chamber 8, and extends into the combustion chamber 8, and terminates at its downstream end 23 short of the downstream end 10 of the combustion chamber 8. A flame damping means provided by a cylindrical metal mesh damping screen 106 is located in the downstream end 10 of the combustion chamber 8 adjacent the exhaust port 19 for preventing the flame in the combustion chamber exiting through the exhaust port 19. The damping screen 106 terminates in a semi-cylindrical end cap 107 also of metal mesh material for ensuring against exiting of flames through the exhaust port 19. The damping screen 106 essentially operates on a Davy lamp principle for preventing a flame or flames which are burning in the combustion chamber 8 exiting through the exhaust port 19.

The ignition electrode 40 extends through the upstream end 22 of the catalytic element 20 and terminates in its tip 41 just downstream of the upstream end 22. However, this is sufficient in combination with a diffuser member 109 for acting as a stabilising means for causing the fuel gas to burn in a flame downstream of the electrode tip 41, and also downstream of the upstream portion 51 of the catalytic element 20. In this embodiment of the invention the diffuser member 109 is substantially similar to the diffuser member 91, with the exception that elongated grooves 110 extend longitudinally along the flats 92 and form a plurality of circumferentially spaced apart channels for accommodating the fuel gas/air mixture into the combustion chamber 8. The combination of the grooves 110 with the flats 92 further enhance the formation of a carousel of corona type flames which burn around the electrode tip 41 downstream thereof in the core 21 of the catalytic element 20 for raising the temperature of the downstream portion 50 of the catalytic element 20 to or above its ignition temperature.

The electrical connector 48 connects the output terminal 47 of the piezo electric igniter 44 to the connector member 72, and the tubular member 5 provides electrical continuity between the connector member 72 and the engagement member 82. The electrode tip 41 cooperates with the annular engagement member 82 for forming the spark gap 43 across which a spark arcs on a voltage being applied to the ignition electrode 40.

The mixer body member 71 in this embodiment of the invention is not provided with a venturi bore, rather, the supply pipe 75 extends through the mixer body member 71 and is connected to a connector pipe 111 which extends from the engagement member 82 for communicating the supply pipe 71 with the diffuser member 109. Air is drawn into the supply pipe 75 through radially extending openings 112 and is mixed with the fuel gas as the fuel gas passes through the supply pipe 75 and the connector pipe 111. The air is drawn through the openings 112 from the air inlet ports 74.

In use, operation of the soldering iron 100 is substantially similar to that of the soldering iron 1 with the exception that initially the first slider member 103 is urged from the off position to the on position for supplying fuel gas, and in turn the fuel gas/air mixture to the combustion chamber 8. The second slider member 104 is then operated from the rest position to the activating position in the direction of the arrow C for activating the piezo electric igniter 44 for applying the voltage to the ignition electrode 40 for in turn igniting the fuel gas/air mixture to burn in a carousel of corona flames around the electrode tip 41 but downstream thereof in the core 21 of the catalytic element 20. On release of the second slider member 104 the second slider member 104 returns to the rest position under the spring biasing action in the mechanical linkage 105. The flames continue to burn in the core 21 of the catalytic element 20 thereby raising the downstream portion 50 of the catalytic element 20 to its ignition temperature. At this stage, fuel gas/air mixture along the outer surface of the downstream portion 51 of the catalytic element 20 commences to convert to heat by the catalytic reaction on the outer surface 25 of the catalytic element 20, and the catalytic reaction rapidly spreads upstream through the catalytic element 20 to the upstream portion 51, which thereby absorbs the fuel gas/air mixture passing into the core 21 of the catalytic element 20 adjacent the upstream end 22 thereof. This in turn starves the flames of fuel gas/air mixture, thereby extinguishing the flames. The soldering iron is switched off by sliding the first slider member 103 in the direction of the arrow B to the off position, thereby operating the isolating valve into the isolating mode.

An advantage of the soldering iron 100 of this embodiment of the invention is that the combustion chamber housing 6 can be readily removed from the tubular member 5 by releasing the gland nut 87 and in turn, the outer tubular member 84 and the combustion housing 6 can then readily be replaced with an alternative combustion housing 6 with, for example, a soldering tip 15 of different size or shape. By virtue of the fact that the catalytic element 20 is located within the combustion chamber 8 there is no danger of damage to the catalytic element 20 on removal of the combustion housing 6 which remains in the combustion chamber 8 when the combustion housing 6 has been disengaged from the tubular member 5. Additionally, by virtue of the fact that the ignition electrode 40 only extends a relatively small distance beyond the annular engagement member 82, the annular engagement member 82 substantially protects the ignition electrode 40, thereby avoiding damage to or bending of the ignition electrode 40 while the combustion housing 6 has been removed.

Referring now to FIG. 17 there is illustrated a soldering head 120 according to another embodiment of the invention for attaching to the soldering iron 100 which has been described with reference to FIGS. 13 to 16. The soldering head 120 is substantially similar to the soldering head 101 of the soldering iron 100 and similar components are identified by the same reference numerals. The main difference between the soldering head 120 and the soldering head 101 is in the combustion chamber housing 6. In this embodiment of the invention the damping means for preventing the flame or flames exiting through the exhaust port 19 is provided by a damping rod 121. The damping rod 121 extends from a bore 123 in the soldering tip 15 into the combustion chamber 8, and in turn into the core 21 of the catalytic element 20 from the downstream end 22 thereof towards the upstream end 23. The damping rod 121 is of heat conductive material, namely, copper and is in tight heat conductive engagement with the soldering tip 15 in the bore 123.

The damping rod 121 as well as damping the flame in the combustion chamber 8, has two further functions, namely, it facilitates heat transfer from the catalytic element 20 and the combustion chamber 8 into the soldering tip 15, thereby providing more efficient heat transfer into the soldering tip 15, and also acts to more evenly distribute the fuel gas/air mixture throughout the catalytic element 20 after the flame has been extinguished for providing more efficient conversion of the fuel gas/air mixture to heat. Indeed, it has been found that the provision of the damping rod 121 permits a reduction in the size of the catalytic element 20, and it has been found that a heat output can be achieved from the soldering tip 15 which is similar to the heat output from the soldering tip 15 of the soldering heads already described, with a reduction of up to 15% to 20% in the size of the catalytic element 20.

Additionally, the damping rod 121 further serves to increase the thermal mass of the soldering tip 15, thereby minimising fluctuation in the temperature of the soldering tip 15 during use.

The damping rod 121 terminates in the upstream direction well short of the electrode tip 41 for permitting the carousel of corona flames to burn in the core 21 of the catalytic element 20 between the electrode tip 41 and the damping rod 121 downstream of the electrode tip 41. In this way the fuel gas/air mixture burns in a carousel of corona flames downstream of the upstream portion 51 of the catalytic element 20.

Otherwise, operation of this soldering head 120 when attached to the handle 101 of the soldering iron 100 is identical to the operation of the soldering iron 100 which has already been described.

Referring now to FIG. 18 there is illustrated a head 130 for use with the gas powered heating device of FIGS. 13 to 16 for converting the soldering iron 100 of FIGS. 13 to 16 to a hot gas blower, for providing a working stream of hot gases for heating an article, for example, for applying to electrically insulating plastics sleeves of the type used for covering electrical connections, for example, connections of electric cables to spade lugs or the like for shrinking the sleeves around the electrical connection. The head 130 comprises a combustion chamber housing 6 which is similar to the combustion chamber housing 6 of the soldering head 101. However, instead of terminating in the solid portion 14 and the soldering tip 15, the combustion chamber housing 6 of the head 130 terminates in an outlet nozzle 131 through which a bore 132 extends from the combustion chamber 8 for accommodating hot gases, which typically are hot exhaust gases for forming the working stream of hot gases for playing on any article to be heated. In this embodiment of the invention the bore 132 through the nozzle 131 acts as the exhaust port, and accordingly, no other exhaust port is provided from the combustion chamber 8.

A damping screen 106 which is identical to the damping screen 106 of the soldering head 101 is located in the downstream end 10 of the combustion chamber 8 for preventing exiting of a flame from the combustion chamber 8 through the nozzle 131, when the fuel gas is being initially burnt with the flame for raising the temperature of the catalytic element to the ignition temperature.

By releasing the gland nut 87 as already described the head 131 may be interchanged with any of the heads 120 or 101 on the gas powered heating device 100 so that the gas powered heating device 100 may be used as a soldering iron or a hot gas blower.

Operation of the heat exchange tool when fitted with the hot gas blower head 131 is similar to that already described with reference to FIGS. 13 to 16. When the downstream portion 50 of the catalytic element 20 has been heated to its ignition temperature by the flame, and the upstream portion 51 reaches its ignition temperature as already described, the fuel gas/air mixture entering the core 21 of the catalytic element 20 is converted to heat upstream of the corona of flames, thereby, extinguishing the corona of flames. Exhaust gases from the catalytic reaction between the fuel gas/air mixture and the catalytic element 20 exhaust at a relatively rapid rate through the bore 132 of the nozzle 131, and may be played on any article to be heated.

While the gas burners according to the invention has been described for use in a soldering head of a gas powered heating tool, and as a hot gas blower head 131 of the gas powered heating tool, it will be appreciated that the gas burner may be used in any other heads for attachment to the gas powered heating tool. For example, it is envisaged that the gas burner may be used in a head which would be suitable for melting hot melt glue so that the gas powered heating tool could be used as a glue gun. In which case, the general construction of the head and handle would be different, and more appropriate to a glue gun. Similarly, the gas burner may be provided in a gas powered clothes pressing iron, in a hair curling tongs, a hair curler, or indeed in many other heating devices, where it is convenient to provide the heating device with a substantially automatic ignition arrangement for raising the temperature of the catalytic element to its ignition temperature. In the case of a hair curling tongs or a hair curler, it is envisaged that the working body member would be provided by a hair receiving housing, which typically, would be of cylindrical barrel shape around which hair to be curled would be wrapped. The hair receiving housing typically, would be arranged around the catalytic element for receiving radiant heat therefrom. Alternatively, the hair receiving housing may be located around a combustion chamber housing which in turn would define a combustion chamber within which the catalytic element would be located. The hair receiving housing may or may not be in heat conducting engagement with the combustion chamber housing. If not in heat conducting engagement, the hair receiving housing would be heated by radiant heat from the combustion chamber housing. The general construction of such a hair curling tongs or a hair curler, or indeed, the other such heating devices discussed above will be known to those skilled in the art.

It is also envisaged that a gas burner according to the invention may be used, for example, in a gas cooker, for example, in the hob of a gas cooker, in a space heater, or indeed, in any other such heater, cooker or heating device which may or may not be provided with a combustion chamber. In such cases, the catalytic element would be located in a convenient location, for example, mounted on a hob or mounted in a front face of a space heater, and the ignition means, would be located for igniting the fuel gas/air mixture to burn in a flame adjacent the catalytic element for heating the catalytic element downstream of a portion of the catalytic element, so that the catalytic element on reaching its ignition temperature would convert the fuel gas/air mixture to heat, thereby starving the flame of the fuel gas/air mixture, and in turn extinguishing the flame. It is envisaged that in cases where a diffuser is provided that the diffuser may be coated with a gas catalytic combustion material which as it is heated by the flame in the core of the combustion element would commence to convert the fuel gas/air mixture to heat, thereby starving the flame of fuel gas/air mixture and thus extinguishing the flame. In such cases, it is envisaged that it would not be necessary to extend the actual catalytic element upstream of the flame which would burn adjacent the diffuser. Alternatively, a heat conducting arrangement would be provided for transferring heat from the flame to the diffuser for raising the diffuser and the catalytic combustion coating thereon to the ignition temperature of the catalytic combustion coating.

It will be appreciated that any other suitable gas catalytic combustion element may be used besides that described in the embodiments of the invention. For example, the catalytic combustion element may comprise a ceramic substrate or a fibre substrate. It will also be appreciated that the various components described may be of other suitable material besides those described.

It is also envisaged that a thermostat for controlling the temperature of the working body member may be provided. Typically, the thermostat would be mechanically or otherwise connected to a valve for controlling the flow rate of fuel gas. Such a valve may be solely controlled by the thermostat, or alternatively the thermostat may be mechanically or otherwise connected to the isolating valve or regulating valve for likewise controlling the flow rate of fuel gas to the catalytic element. In general, where the gas burner according to the invention is used in a hair curling tongs, a hair curler, a clothes pressing iron, or a glue gun, a thermostat, in general, would be provided for controlling the temperature of the device.

What is claimed is:

1. A gas burner comprising:

a gas catalytic combustion element for receiving fuel gas and for converting the fuel gas to heat by a catalytic reaction, the catalytic element defining a hollow core having a longitudinally extending central axis, the catalytic element terminating in an upstream plane at its upstream end and extending in a downstream direction therefrom, the upstream plane extending transversely of the central axis, and the hollow core extending into the catalytic element from the upstream plane through which fuel gas is delivered into the hollow core, an ignition means comprising an ignition electrode for forming a spark on a voltage being applied thereto for igniting the fuel gas to burn in a flame for raising at least a portion of the catalytic element to its ignition temperature, the ignition electrode terminating in an electrode tip and extending into the hollow core of the catalytic element with the electrode tip disposed intermediate the upstream plane and a downstream end of the hollow core for co-operating with the catalytic element for locating the flame in the hollow core of the catalytic element so that as the catalytic element progressively reaches its ignition temperature, the flame is starved of fuel gas and is thereby extinguished.

2. A gas burner as claimed in claim 1 in which the electrode tip is disposed adjacent the upstream plane of the catalytic element.

3. A gas burner as claimed in claim 1 in which the electrode tip is slightly spaced apart from the upstream plane of the catalytic element.

4. A gas burner as claimed in claim 1 in which the ignition electrode defines with the catalytic element an annular aperture at the upstream plane through which fuel gas passes into the hollow core of the catalytic element.

5. A gas burner as claimed in claim 1 in which the catalytic element comprises an elongated side wall extending around the hollow core.

6. A gas burner as claimed in claim 5 in which the side wall of the catalytic element extends completely around the hollow core.

7. A gas burner as claimed in claim 1 in which a portion of the catalytic element extends upstream of the location at which the fuel gas burns in a flame for forming an upstream portion of the catalytic element over which the fuel gas passes prior to being burned in a flame.

8. A gas burner as claimed in claim 1 in which a combustion chamber housing is provided, the combustion chamber housing defining an elongated combustion chamber extending between an upstream end and a downstream end relative to the direction of flow of fuel gas, the catalytic element extending into the combustion chamber from the upstream end thereof.

9. A gas burner as claimed in claim 8 in which the catalytic element is located in the combustion chamber for facilitating the flow of fuel gas from the upstream end to the downstream end along both an inner surface and outer surface of the side wall of the catalytic element.

10. A gas burner as claimed in claim 8 in which the combustion chamber housing is of a heat conductive material.

11. A gas burner as claimed in claim 1 in which a working body member of heat conductive material is provided, the working body member co-operating with the catalytic element for receiving heat therefrom for heating the working body member.

12. A gas burner as claimed in claim 11 in which the working body member comprises a soldering tool tip.

13. A gas burner comprising:

a gas catalytic combustion element for receiving fuel gas and for converting the fuel gas to heat by a catalytic reaction, the catalytic element defining a hollow core having a longitudinally extending central axis and extending from an upstream end through which fuel gas is delivered into the hollow core, and an ignition means for igniting the fuel gas to burn in a flame for raising at least a portion of the catalytic element to its ignition temperature, the ignition means being located relative to the catalytic element for co-operating with the catalytic element for forming a stabilizing means for stabilizing and locating the flame in the hollow core of the catalytic element so that as the catalytic element progressively reaches its ignition temperature, the flame is starved of fuel gas is thereby extinguished.

14. A gas burner as claimed in claim 13 in which the ignition means locates the flame downstream of an upstream portion of the catalytic element relative to the direction of fuel gas flow through the catalytic element, the upstream portion of the catalytic element being located adjacent the fuel gas stream upstream of the flame for converting the fuel gas to heat on the upstream portion of the catalytic element being raised to its ignition temperature for starving the flame of fuel gas.

15. A gas burner as claimed in claim 13 in which the catalytic element extends from an upstream plane which extends transversely of the central axis, the hollow core extending into the catalytic element from the upstream plane, and the ignition means comprises an ignition electrode terminating in an electrode tip for forming a spark on a voltage being applied thereto.

16. A gas burner as claimed in claim 15 in which the electrode tip is disposed adjacent the upstream plane of the catalytic element.

17. A gas burner as claimed in claim 15 in which the electrode tip is slightly spaced apart from the upstream plane of the catalytic element.

18. A gas burner as claimed in claim 15 in which the ignition electrode extends into the hollow core of the catalytic element, and the electrode tip is disposed intermediate the upstream plane and a downstream end of the hollow core.

19. A gas burner as claimed in claim 15 in which the ignition electrode defines with the catalytic element an annular aperture at the upstream plane through which fuel gas passes into the hollow core of the catalytic element.

20. A gas burner as claimed in claim 13 in which the catalytic element comprises an elongated side wall extending around the hollow core.

21. A gas burner as claimed in claim 13 in which a combustion chamber housing is provided, the combustion chamber housing defining an elongated combustion chamber extending between an upstream end and a downstream end relative to the direction of flow of fuel gas, the catalytic element extending into the combustion chamber from the upstream end thereof.

22. A gas burner as claimed in claim 21 in which the catalytic element is located in the combustion chamber for facilitating the flow of fuel gas from the upstream end to the downstream end along both an inner surface and outer surface of the catalytic element.

23. A gas burner as claimed in claim 14 in which a working body member of heat conductive material is provided, the working body member co-operating with the catalytic element for receiving heat therefrom for heating the working body member.

24. A gas burner as claimed in claim 23 in which the working body member comprises a soldering tool tip.

25. A gas burner as claimed in claim 13 in which an isolating means is provided, the isolating means being alternately operable in an isolating mode and a communicating mode for respectively isolating and communicating a fuel gas supply with the catalytic element, and an operating means is provided for alternately operating the isolating means in the isolating and communicating modes, and for operating the ignition means for igniting the fuel gas to burn in a flame.

26. A gas burner as claimed in claim 25 in which the operating means operates the isolating means and the ignition means sequentially, the isolating means being operated first from the isolating mode to the communicating mode for communicating the catalytic element with the fuel gas supply.

27. A gas burner as claimed in claim 25 in which the operating means is moveable between an off position in which the isolating means is operated in the isolating mode and an on position in which the isolating means is operated in the communicating mode, and the movement of the operating means form the off position to the on position operates the ignition means for igniting the fuel gas to burn in a flame.

28. A gas powered heating device comprising a handle and the gas burner as claimed in claim 25, the gas burner extending from and being connected to the handle, the isolating means being located in the handle, and the operating means being located in the handle, and being operably associated with the isolating means for alternately operating the isolating means in the isolating mode and in the communicating mode, and the operating means being operably associated with the ignition means for operating the ignition means for igniting the fuel gas to burn in the flame.

\* \* \* \* \*